United States Patent
Charbonnet et al.

(10) Patent No.: US 12,260,499 B1
(45) Date of Patent: Mar. 25, 2025

(54) THREE-DIMENSIONAL DISPLAY OF GENEALOGICAL INFORMATION

(71) Applicants: Michael D. Charbonnet, New Orleans, LA (US); Derrick W. Charbonnet, Ocean Springs, MS (US); M. Dean Charbonnet, Jr., New Orleans, LA (US); Laura T. Charbonnet, New Orleans, LA (US); Clark R. Charbonnet, New Orleans, LA (US)

(72) Inventors: Michael D. Charbonnet, New Orleans, LA (US); Derrick W. Charbonnet, Ocean Springs, MS (US); M. Dean Charbonnet, Jr., New Orleans, LA (US); Laura T. Charbonnet, New Orleans, LA (US); Clark R. Charbonnet, New Orleans, LA (US)

(*) Notice: Subject to any disclaimer, the term of this patent is extended or adjusted under 35 U.S.C. 154(b) by 128 days.

(21) Appl. No.: 18/120,763

(22) Filed: Mar. 13, 2023

Related U.S. Application Data

(63) Continuation of application No. 18/107,271, filed on Feb. 8, 2023, now abandoned.

(60) Provisional application No. 63/308,172, filed on Feb. 9, 2022.

(51) Int. Cl.
G06T 17/00 (2006.01)
G06F 3/04817 (2022.01)
G06F 3/0482 (2013.01)

(52) U.S. Cl.
CPC ........ G06T 17/005 (2013.01); G06F 3/04817 (2013.01); G06F 3/0482 (2013.01)

(58) Field of Classification Search
CPC .. G06T 17/005; G06F 3/04817; G06F 3/0482
See application file for complete search history.

(56) References Cited

U.S. PATENT DOCUMENTS

| | | | | |
|---|---|---|---|---|
| 2001/0041327 A1* | 11/2001 | Gross | ..................... | G09B 19/00 434/154 |
| 2005/0116954 A1* | 6/2005 | Ripps | .................... | G06T 11/206 345/440 |

* cited by examiner

*Primary Examiner* — Grace Q Li
(74) *Attorney, Agent, or Firm* — Olson & Cepuritis, LTD.

(57) ABSTRACT

A computer-implemented method for incorporating a time dimension to create a 3D graphics display from genealogical family tree data showing discrete individuals in multiple generations of a genealogical family tree data set, a computerized system for displaying the 3D genealogical family tree data set, and a non-transient medium encoding instructions for implementing the method are described herein. Icons representing individuals of interest in the three-dimensional genealogical family tree data set are displayed within a virtual three-dimensional space employing three orthogonal coordinates wherein the vertical axis (Z axis) represents chronological time extending backward in time from the current date to an earlier time during which specified individuals or generations of individuals lived, and each icon has a height or extent in the Z-dimension representative of the lifespan of the individual represented by the icon and is positioned in the Z-dimension at coordinates corresponding to that lifespan.

24 Claims, 8 Drawing Sheets

THREE-DIMENSIONAL DISPLAY OF GENEALOGICAL INFORMATION

CROSS-REFERENCE TO RELATED APPLICATIONS

This application is a continuation of U.S. application Ser. No. 18/107,271, filed on Feb. 8, 2023, which claims the benefit of U.S. Provisional Application No. 63/308,172, filed on Feb. 9, 2022, each of which is incorporated herein by reference in its entirety.

FIELD OF THE DISCLOSURE

The disclosure relates to genealogy computer applications, methods of displaying genealogical information, and systems for displaying genealogical information.

BACKGROUND

From ancient times and for many reasons, people have tracked and recorded who gave birth to whom. Current genealogical descendancy and ascendency charts typically show representations of the subject individuals as blocks in a tree-like or root-like array, or as wedge-shaped sections in a fan-like array. The chronology information in these displays is limited to the relative position of the blocks or fan sections and whatever written dates may be included in the text accompanying the individuals' names. There is no visual representation of an individual's age, of when an individual lived, of how the lifetime of one individual relates to the lifetimes of other individuals, or of what historical events may have taken place during an individual's lifetime. Because of this, a great deal of available historical relationship information is very difficult to recognize and appreciate. To remedy this shortcoming, the methods, systems, and media described herein facilitate the exploration of such relationships by providing for a dynamic three-dimensional computer-generated display that incorporates time into an array of icons representing individuals in the display.

SUMMARY

A computer implemented method for displaying genealogical information in a virtual three-dimensional (3D) array (also referred to here as a virtual space) which has a time dimension to show the period of time during which each individual in genealogical family tree lived in the past or is now currently living. In the most preferred embodiments, time and history move upward into the past on the vertical axis and the icons representing more distant ancestors are positioned higher up in the display. Although this may be a static display or a series of static displays, in the most preferred embodiments the methods, systems, and media provide for a dynamic display in which an avatar of the viewer can move up, down, and around both inside of and outside of a 3D array or "hanging forest" of family-member icons so as to be able to see the icons from any angle, height, or position and so as to be able to interact with any icon in the display. Persons using the methods are referred to herein either as the "user" or the "viewer," interchangeably.

Individuals in a genealogical family tree are displayed as three-dimensional icons in an isometric projection of a three-dimensional virtual space having three orthogonal dimensions (a time dimension referred to herein as the Z dimension, and two arbitrary spatial dimensions referred to herein as the X and Y dimensions) in which a time scale is provided in the Z dimension, the heights of the icons are scaled in the Z dimension according to the lifespan of the individual, and the positions of the icons in the Z dimension are determined by the birth date of the individual, so that genealogical chronology of each displayed individual and chronological relationship information among individuals is conveyed to the viewer through comparative height and location in the time dimension axis of the vertical space.

The position of the icons in the X and Y dimensions in the computer display may convey additional information to the viewer, as would be the case in an archipelago display view in which each of several family groups related affinially has its own separate and distinct array of only consanguineal relationships. A low aspect ratio is preferred for the icons so that the icons of long-lived adults appear as tall and narrow solids such as cylinders, prisms, or other tall shape. The icons can be any desired shape, provided the "height" of the icon in the Z dimension is defined by the birth and death dates for deceased individuals and by birth and present date for living individuals, and provided the icon width and depth in the X and Y dimensions is confined to values small enough to avoid overlap of the icons. The shape, color, or other attribute of the icons may also convey information. For example, the icons for females might be assigned a round profile in the X-Y dimensions so that icons representing females are cylinders, while the icons for male might be assigned a square or rectangular X-Y profile, so that the icons for males are square prisms. The user most preferably is represented on the computer display as an avatar (e.g., a pointer or other icon) which can be maneuvered among the icons representing individuals so that the computer display screen shows the icons from the perspective of the user moving up, down, and around through the virtual space and controlling the pan, tilt, and zoom aspects of the screen view much like a player avatar in a computer game. Also described herein is a computerized system for converting a genealogical family tree set into a 3D graphics display implementing the method described herein, as well as a non-transitory computer-readable medium storing instructions for performing the method.

The computer-implemented methods described herein improve the visual presentation of genealogical information on a computer display, and particularly improving the display of chronological relationships between individuals in a family tree so as to make genealogical information accessible in ways not previously possible. The computer-implemented methods described herein provide a user with the ability to dynamically maneuver through a virtual assembly of relatives of a given root person, which cannot be easily performed with static genealogical information displays.

In the preferred embodiments, the time axis of the virtual space (i.e., the Z axis) is calibrated with a timeline and is oriented in the vertical direction on the computer display, with the present date at the bottom of the display and past dates going "upward." The extent or apparent height of each icon in the Z dimension thus represents the lifespan of the individual represented by the icon, and the position of each icon vertically along the Z axis shows the dates during which the individual lived. Preferably, connector lines (also referred to herein as tie-lines) which run between selected icons are displayable either upon command by a user or by default to show parent-child, spousal, and/or sibling relationships. The connector lines may be color coded or otherwise indicative of different relationships or to show other information, such as the fact that a relationship is a second marriage.

In the preferred embodiments the virtual space also has width (X) and depth (Y) dimensions in addition to the height or time dimension (Z). Icons of the individuals living during a particular time period preferably are distributed to the left and right (X dimension) and/or front and back (Y dimension) relative to a selectable root individual (also referred to herein as a "Home Person" or "HP") preferably based on the geometric attributes of a particular viewing scene chosen by the user and on the particular root individual chosen by the user, or for clarity, for sorting, or for other reasons. Optionally, the icons are displayable in a variety of shapes, but always with an apparent height along the time dimension (Z) that is representative of the lifespan of the individual along the timeline, with a position along the time dimension axis having as endpoints the birth date and death date of the individual. In the most preferred embodiments, all individuals who are shown in the source data to be still living will have the bottoms of their icons positioned at Z=zero. Generally, the X and Y axes will be dimensionless (i.e., not having any specifically designated units of measurement) to allow flexibility of expanding the displayed virtual space in the X-Y dimensions, e.g., to better accommodate placement of the various icons during time periods when many individuals are or have been living simultaneously.

As one example, icons are spaced in the X and Y dimensions to help convey genealogical relationships as in traditional family tree displays, such as the traditional wedge-like arrangement showing only direct ancestors, with parents of a given individual distributed right/left or backward/forward from that individual (in an X or Y dimension), and different generations distributed in an orthogonal dimension (e.g., in the Y or X dimension) to ease crowding and visually distribute individuals into different generations (i.e., relative to a home person). Alternatively, in some embodiments, icons representing generations of individuals are distributed with collateral and lineal ancestors together, such as in the so-called descendancy view in the FamilySearch™ website. Optionally, tie-lines between spouses, parents, children, and/or siblings are selectively included to further clarify the generational relatedness of family members to a home person.

In some embodiments, the icons are selectively rendered in different shapes or combinations of shapes (e.g., one shape for the main bulk of the icon, and one or more other shape at the top or bottom of the icon) to represent one or more distinguishing characteristic, such as gender, different generations relative to a selected individual, lineal ancestry versus collateral ancestry, and/or any other genealogical, geographic, or relationship characteristic. The cross-sectional shape of the icon perpendicular to the Z axis can vary so as to form more complexly shaped icons. In addition, or alternatively, the icons are distinguishable by properties or characteristics such as color, shading, fill patterns, bands of different colors, images, text, flashing or blinking brightness variations, and/or other visual indicators to convey distinguishing characteristics or attributes. In many cases, the icons include different shapes, as described above, as well as one or more colors, shading, and other visual indicators.

In the most preferred embodiments, the icons are rendered as tall and narrow cylinders, prisms, or other shapes which can create the visual effect of a forest of icons. Icons representing individuals who died in the past appear to hang in the air at their respective places on the vertical timescale and can contribute to the visual effect of a hanging forest. In the most preferred embodiments, the icon array is viewable both from "inside" the group of icons (i.e., the viewer can rotate about to see icons in all directions) and from "outside" the group of icons (i.e., the viewer can see the group of icons from a distance, from any perspective (e.g., any height, angle and location), and the viewer's avatar can move freely among all of the positions.

Optionally, placeholder icons are used to represent individuals who existed in the past but whose names may not be known (e.g., unidentified lineal ancestors) or individuals who may or may not have existed in the past or may or may not exist in the future (e.g., hypothetical siblings of an individual represented by a given icon who might be used to perhaps generate a view of potential third cousins). Most preferably, icons representing ascending, descending, and other relationships are simultaneously displayable, with the number of icons displayed at any one time being limited by the capacity of the computer or by selections made by a user.

Optionally, reference planes located at any date along the Z axis, such as at the date of an historical event (e.g., the California gold rush of 1849), are displayable to help the viewer see which individuals were alive and were of what age at that particular date. Similarly, reference ranges beginning and ending at selected dates are displayable to visually indicate which individuals were alive during a particular time span. Most preferably, timescales, "altimeters" calibrated in years, compass roses, or other navigation aids are displayable together with the array of icons in order to aid the use in navigating the virtual space. Optionally, menus or legends, either always visible in the virtual space or appearing as "popup" windows, can provide access to visual or audible information specific to an individual represented by an icon, a family, an historic event, an historical period, a geographical location, an occupation, a noble title, an organization associated with an individual, and/or any other information about an individual, the individual's culture, ethnicity, or other characteristic.

The display of icons preferably also is encoded as a graphical user interface (GUI) so that selection of an icon by a user, using a mouse, game controller, or other input device will elicit a popup display with a list of actions and/or information related to the individual represented by the icon. In such embodiments, selection of an item in the popup menu will execute the action or display the indicated information. For example, a popup menu could give the user a choice of opening a profile file for the individual, resetting the individual as the Home Person, navigating from the individual to a particular relative of the individual (a parent, sibling, spouse, etc.), altering parameters of the display (e.g., background, orientation, and the like), display an image of the individual or of a document related to the individual (e.g., naturalization papers, draft cards, marriage certificates, birth certificates, and the like), play an audio file (e.g., a recording of the individual's voice), displaying a list of siblings, children, or other relatives of the individual, and the like.

In preferred embodiments, genealogical relationships are derivable from previously assembled genealogical data and are available to the viewer to display individuals of any relationship to a selected root person or any portion of a genealogical data set as may be desired. Preferably, relationships between historical data and the genealogical data are derivable from available historic data and are available for selection by the user for visual or aural display. Preferably, the appearances of the icons and tie-lines and other display elements are selectively modifiable and codable to convey any available information about individuals represented in the data set, including, for example, country of birth, parental line, occupation, gender, longevity, degree of cousin relationship to a home person, and any other information contained in or derivable from the available information in the data set.

Information is retrievable by a variety of means such as keyboard input, audio input (e.g., voice commands, optionally in a language selected by a user), mouse selection, game controller selection, and the like. In some embodiments, genealogical and historical information related to an individual or the individual's historical period and/or a geographical location associated with the individual are conveyed to the user through text, graphics, audio (voice, music, and/or other sounds), still images, and video to enhance the experience of the viewer and engage multiple senses. In some embodiments, the display is rendered as augmented reality or virtual reality experiences. Optionally, a family tree chart can initially be displayed in two-dimensions as in traditional genealogical display systems, and then can be animated so that the icons "grow" out of the X-Y plane and ascend into the past in the Z dimension.

In some embodiments, the icons representing individuals in a family tree are arranged in the X and Y dimensions so that the view down the time axis (Z) from above appears similar to a traditional family tree (with or without collateral relatives) or a fan display (typically including lineal relatives only), but when viewed from any other perspective the icons are seen suspended in the Z axis dimension into the past, in a wave-like or step-like cascade, with each icon having an apparent "height" representative of the lifespan of the individual represented by the icon and each is suspended "above" the X-Y plane of in the virtual space at Z coordinates corresponding to the period of time in which the individual represented by the icon lived. This can give the user the impression that deceased individuals are suspended in the heavens above the X-Y plane of the present date. Such an arrangement simplifies the use of tie-lines to show familial relationships, but may get "crowded" and complex when multiple family lines and/or large families are shown in the same virtual space (e.g., showing collateral relatives along with lineal ancestors).

In other embodiments, the icons are arrayed together in family groups in the X and Y dimensions and may appears as islands in an archipelago, e.g., to facilitate displaying multiple individuals and family groupings (including, e.g., family groupings with spousal pairs and collateral relatives such as siblings of each spouse). In some embodiments, relationships are illustratable in the display using color coding with one or more colors to indicate various relationships, shading, text, and the like, in addition to or in place of tie-lines. For example, in some display embodiments, children are shown "surrounding" or "between" their parents, and family groups are preferably spaced from each other by some X and Y offset values sufficient to provide room for icons representing the various family members in the groups. Preferably, the X-Y spacing of the groups is adjustable based on factors such as the number of family groups and number of icons being displayed in any given view. As always, the icons are arrayed in the time dimension (Z), and tie-lines, text, shading colors and color combinations, etc. optionally are displayable on or in association with the icons to show the various familial relationships and other information of interest to the user.

In some embodiments the user may choose which individuals or groups of individuals will be visible or invisible within the virtual space, such as the number of generations, ancestors of spouses, siblings of direct ancestors, etc. in relation to a selected root person.

Optionally, a search function with the ability to search for a family member using any parameter is included, as well as a family-member go-to function to take the viewer to the icon or to the vicinity of the icon of a selected family member, and or a navigation go-to function to take the viewer to coordinates specified by any parameter.

In some embodiments, a "cut scene" can be provided when interacting with an icon, wherein a new scene opens in a separate window.

In some embodiments, source data files in which the same individual appears more than one time can be filtered and altered by displaying the duplicates and/or eliminating the duplicates.

Existing genealogical display methods do not rely significantly on the availability of birth and death dates in their source data because these methods do not make any material use of date information in their displays. A distinguishing characteristic of the present invention is that the availability of such dates is a mandatory requirement because a specific birth date and either a specific death date or the fact that the person in question is still living must be known in order to support the generation of the icon representing each person. Therefore, in the most preferred embodiments of the present invention any birth dates and death dates which are missing from the source data or are obviously incorrect in the source data are replaced with proxy dates so as to enable the calculation of a representative Z-axis height and Z-axis position for the icon of the family member with the missing dates.

In addition, apostolic succession data (i.e., without represented spouses), as well as genealogical data to enable the display of the descent of religious orders such as Christian bishops, ministers, and the like, can be included.

In some embodiments, a user can record a "journey" of his or her icon as it navigates through the 3D virtual space, optionally together with a spoken or written narration and the ability to post the recorded trip on social media or to send the recorded file to others.

In another aspect, a non-transitory computer readable medium that is configured to store instructions is described. The instructions, when executed by one or more processors, cause the one or more processors to perform a process that includes steps described in the above computer-implemented methods or described in any embodiments of this disclosure.

In yet another aspect, a computerized system for carrying out the methods described herein may include one or more processors and a storage medium that is configured to store instructions for performing the methods. The instructions, when executed by one or more processors, cause the one or more processors to perform a process that includes steps described in the above computer-implemented methods or described in any embodiments of this disclosure.

DETAILED DESCRIPTION

Figure 1:
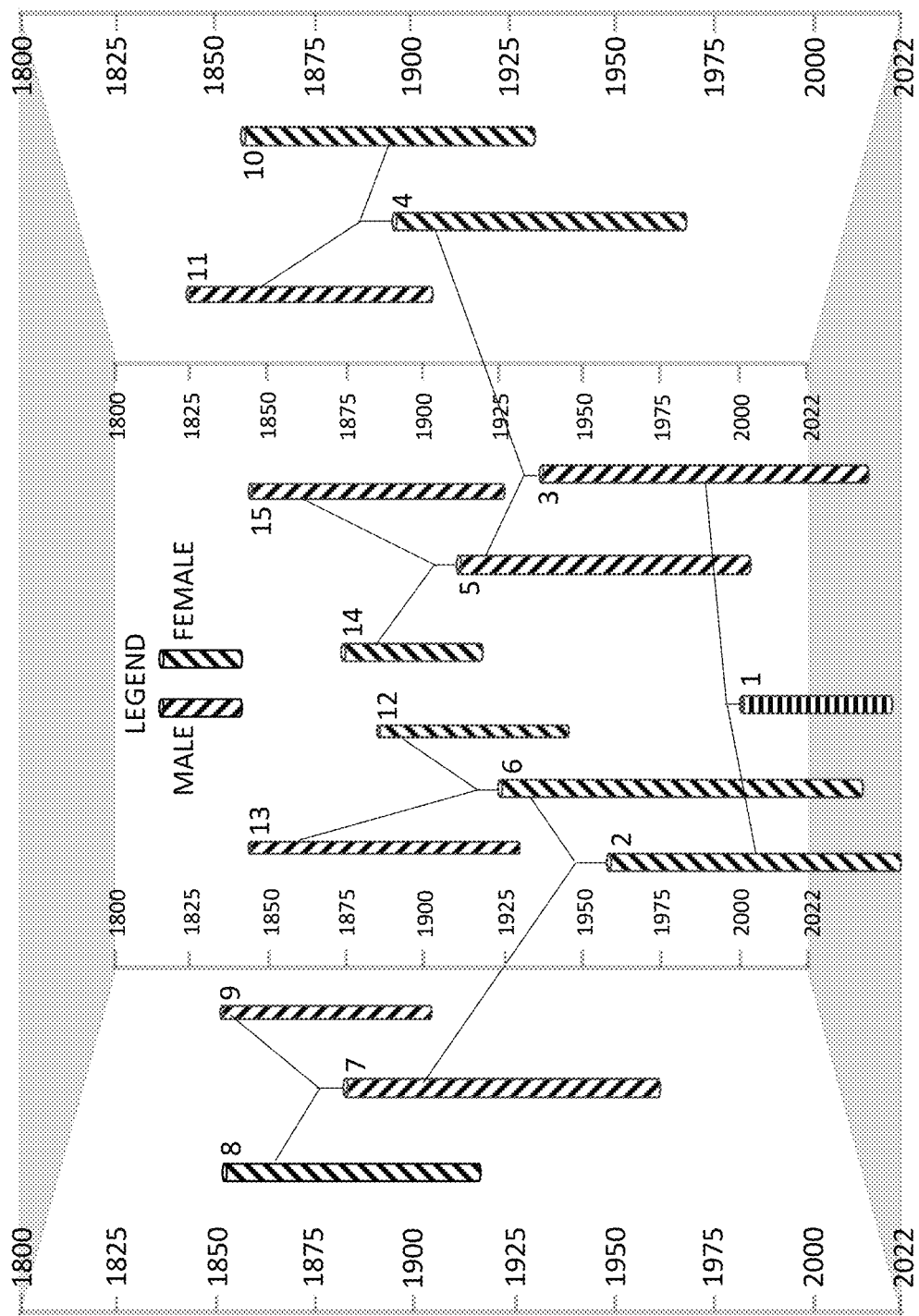
FIG. 1 is a perspective view of a five-generation display array covering the time period from 2022 back to Jan. 1, 1800.

A computer-implemented method for creating a 3D graphics display from genealogical family tree data displaying discrete individuals in multiple generations of a genealogical family tree data set, a computerized system for displaying the 3D genealogical family tree data set, and a non-transient medium encoding instructions for implementing the method are described herein.

Definitions

Consanguineal kin, or consanguines—people with whom one shares one or more common ancestors, however distant. This includes siblings, children, parents, and grandparents, aunts, uncles, nieces, nephews, and cousins of any degree and any generation level. These are sometimes referred to in the vernacular as blood relatives.

Affinal kin, or affines—relatives only by marriage. They are generally referred to as in-laws. If the marriage ends, the affinal relationship ends. Note that the husband of one's mother's sister, though probably referred to as an uncle, is in fact an affine and not a consanguine. One's spouse is also a affine, unless a coincidental consanguineal relationship also exists.

Lineal relatives—those people in a direct line of ascent or descent, including grandparents of any degree, parents, children, and grandchildren of any degree.

Collateral relatives—those members of one's consanguineal kin who are not lineal relatives. Siblings, aunts and uncles, nieces and nephews, and cousins are collateral relatives.

Degrees and removals—terms used to more precisely describe the relationship between cousins. Degree measures the separation in generations from the most recent common ancestor(s) to the nearest parent of one of the cousins. Removal measures the difference in generations between the cousins themselves relative to their most recent common ancestor(s). First-degree, or first, cousins are thus separated by one generation (their parents' generation) from their most recent common ancestors, which are their grandparents. The child of one first cousin is one generation removed from the other first cousin and those two individuals are therefore first cousins one removed.

Source Data—a file containing genealogical information pertaining to a particular family group (often referred to as family tree information), for example information in GEDCOM file format, or information resident in commercial genealogy databases such as ANCESTRY, MYHERITAGE, FAMILYSEARCH, and the like.

Input Software—the computer program which uses the Source Data to create an Input File. The Input Software calculates the Z-axis information for all individuals in the Source Data to determine the icon height and position coordinates for each individual based on their birth and death dates and includes this information in the Input File. The Input Software will deduce, interpolate, extrapolate, or estimate approximate birth and death dates that are missing from the Source Data and include the proxy dates in the Input File. The Input Software also will, to the extent feasible, eliminate duplicate entries in the Source Data and apply other standard error correction techniques to the Source Data in order to make the contents of the Input File as appealing to the user as possible.

Input File—the file containing all of the genealogical information from the Source Data that can be used in a display, including names, dates and places of birth, marriage, and death, individual index numbers, familial relationships, notes, images, audio or video files, and other available data, and also containing the Z-axis height and position information for every individual. There is typically only one run of the Input Software and only one Input File for each tranche of Source Data.

Home Person—the individual in the Input File who is chosen by the user to base a particular Display Array. The choice of Home Person will in most cases determine which of the individuals in the Input File will be included in that Display Array. Home Person is also referred to as "Root Individual."

Scene—the format for geometrically distributing the individual icons on the X and Y axes of the virtual 3D space in which the icons will be displayed. A given implementation of the methods described herein might include choices of several different Scenes, such as a rectangular amphitheater array described in Embodiment I and FIG. 7, in which different generations align in straight rows relative to the X-Y plane, or a curved amphitheater array similar to the array shown in FIG. 7, but in which the different generations are displayed in curved rows relative to the X-Y plane. The geometry of the X and Y coordinates will be different if, for example, the user wants to add affinial kin to a Scene formerly comprising only consanguineal kin, so a separate Scene would be required to include the affinial kin. Some Scenes may be complex, as would be the case in a archipelago scene in which multiple affinially-related family groups may appear as separate "islands" of consanguineal-only arrays.

Scene Name—the name given to a particular Scene to differentiate it from other Scenes.

Display Software—the computer program used to generate a particular Display File based on the user's choice of Scene and the user's choice of Home Person. The Display Software determines which of the individuals in the Input File are to be included in the Display File and establishes the X-axis and Y-axis coordinates for the icons of those individuals. The Display Software will generate a different Display File for every different combination of Scene and Home Person.

Display File—the output of a particular run of the Display Software. The Display File associates the X-axis and Y-axis coordinates and the Z-axis data for the individuals who have been included in the Display File with the genealogical data for those individuals and encodes the information in a format suitable for use by the Array Software to generate a three-dimensional display on a computer display device. The Display File would denote the user's choices of viewing options, such as icon shape, color, and label position, as well as any other user-selectable parameters, perhaps including display background or sky color, reference plane dates and labels, whether to include image or audio or video files with the display, and so on.

Array Software—the computer program which uses a Display File to generate a Display Array on the viewing device. Examples of commercially available Array Software include Unity3D, Unreal Engine, and Godot.

Display Array—the three-dimensional array of icons displayed on a viewing device. In the most preferred embodiments, a virtual avatar of a user can be navigated up, down, and around through the Display Array to provide a user or viewer with views of the icons from different perspectives.

Biographical information—any information about the life, identity and/or origin of an individual. In genealogical family tree datasets, biographical information often includes such information as a surname, a given name, a nickname, the identity of parents, children, siblings and spouses, the date of birth the place of birth, the date of death, the place of death, the cause of death, religious events such as baptism, confirmation, and the like, marriage information, information on how the individual is related to at least one other individual in the dataset, as well as documents, photographs, images, and recordings relating to the individual, and the like. In many genealogical records, there may only be limited information about some individuals, and sometimes even basic information such as gender, a name, a date of birth, and/or a date of death, may be unknown or at least not recorded. When birth and/or death dates are missing, genealogical records may include estimates for the missing dates based on information for parents, and likely lifespans for individuals.

In the methods described herein, icons representing individuals of interest in the three-dimensional genealogical family tree data set are displayed as an array within a virtual three-dimensional space employing three orthogonal coordinates wherein the vertical axis (Z axis) represents chronological time dimensioned in time units selectable by the user, preferably in years to two decimal places, and extending upward and backward in time from the current date and most preferably the current calendar date to an earlier time during which specified individuals or generations of individuals lived. The icons representing the family members in the virtual space are three-dimensional and extend upward on the Z axis at a length (the length of an icon on the Z axis is the height of the icon in the virtual space) equal to the length in time units of the lifespan of the individual represented. Each icon is positioned on the Z axis so that the top of the icon is located at the birth date of the individual represented and the bottom of the icon is located at the person's date of death. Since living persons have no dates of death, the bottoms of the icons of currently-living persons will all align at the same point, which most preferably would be at a Z value of zero representing the present calendar date. The icons of all living persons will thus appear to touch the X-Y plane at "ground level" of Z=0 while the icons of individuals already deceased will appear to float in the "sky" of the virtual space above the ground level plane. In addition to the Z axis representing chronological time, the virtual space includes generally dimensionless orthogonal X and Y axes to represent a "width" and "depth" in the virtual space.

Parents and children are usually alive during at least some concurrent time period, and in many cases grandparents and even great grandparents may also be living during a portion of the lifespan of children, grandchildren, or great grandchildren, so during any given time period on the vertical time axis a large number of icons may typically have to be displayed if all individuals alive during that period are being displayed. The height, width, and depth of the viewable virtual space will vary to accommodate the number of people the user chooses to include within the virtual space. In some embodiments the X and X axes are roughly equivalent in length so as to give the display array an approximately square cross section. Preferably, the X and Y spacing of the icons and the width and depth of the icons can be assigned by algorithms (e.g., spacing algorithms comprising artificial intelligence, relational positioning, such as that used by fighter jets, or swarm intelligence, such as has been used to model bird flocks and fish schools) that automatically space the icons appropriately for viewing, and such algorithms optionally include selectable parameters that allow the user to modify or customize the X-Y distribution of the icons. Different possible geometric arrays of the icons in the virtual 3D space or Display Array may be predetermined and referred to as Scenes. Scenes may vary according to choices made for style, content, or both. An example of the style of a Scene is the rectangular vs. the curved amphitheater discussed above. An example of the content of a Scene is the example above of adding affinial kin to a Scene which had initially comprised only consanguineal kin. In addition, different Scenes may be defined based on an aesthetic preference by the user or to optimize the view of the 3D family tree for a given display device or perspective. Most preferably, different Scenes are selectable by a user according to their Scene Name.

In the most preferred embodiments, the perspective of the image of the virtual space on the computer display changes dynamically in response to input from the user, who can pan, tilt, and zoom ("PTZ") the display in any direction. In such embodiments, an avatar icon, which may be a mouse pointer or other icon, representing the user is shown on the computer display among the array of icons representing individuals in the family tree being viewed. This avatar icon aids the viewer in interpreting the perspective of the icons in the virtual space shown on the computer display screen and, most preferably, serves as a navigation aid as the user moves the avatar through the virtual space. In the most preferred embodiments, both a first-person PTZ point of view of the virtual space based on the orientation of the avatar icon and a detached third-person or cinematic-camera PTZ point of view independent of the orientation of the avatar icon are interchangeably available to the user.

In the most preferred embodiments, the avatar icon representing the user in the virtual space is movable within the virtual space (e.g., by mouse movement). Once positioned in a desired location, the user can then view the virtual space from any desired perspective, field of view, and the like of the virtual space from that location. Alternatively, the user can "move" or "fly" through the virtual space with a viewing perspective that changes under the control and virtual orientation of the user as if the user were viewing the virtual space from within with his own virtual eyes, much like some role-playing video games. Such a dynamically changing personal perspective is particularly suited for a virtual reality implementation of the three-dimensional display.

Preferably, tie-lines representing specified genealogical relationships, such as spousal relationships, sibling relationships, and parent-child relationships, are optionally displayable to link individuals by their genealogical relationships. Tie-lines need not be straight lines and may include curves, angles, divides and intersections, spoke-and-hub arrangements, and any other shape. Tie-lines may optionally be dotted or dashed, may vary in thickness, and may be of any color in order to make the lines in congested areas of the display more readable, to differentiate among relationship types, or convey other information.

A computing system for implementing the methods described herein includes, for example instructions (e.g., software, program code, or machine code), which may be stored in a computer-readable medium for causing the machine to perform one or more processes discussed herein. In some embodiments, the system operates as a standalone device or may be connected (e.g., networked) to other devices. In a networked format, the system may operate in the capacity of a server machine or a client machine in a server-client network environment, or as a peer machine in a peer-to-peer (or distributed) network environment.

The system may correspond to any software, hardware, or combined components, including but not limited to, a client device, a computing server, a cloud computing service, any system on which source genealogical data is native, and various engines, interfaces, terminals, and machines. For example, the system may comprise a personal computer (PC), a tablet PC, a set-top box (STB), a video game console, a personal digital assistant (PDA), a cellular telephone, a smartphone, a web appliance, a network router, an internet of things (IoT) device, a switch or bridge, a cloud computing server, or any machine capable of executing instructions that specify actions to be taken by that system. A system my include one or more processors such as a CPU (central processing unit), a GPU (graphics processing unit), a TPU (tensor processing unit), a DSP (digital signal processor), a system on a chip (SOC), a controller, solid state equipment, an application-specific integrated circuit (ASIC), a field-programmable gate array (FPGA), any other digital processing device, or any combination of these. Parts of the system also include a memory device that stores computer code including instructions that cause the processors to perform certain functions when the instructions are executed, directly or indirectly by the processors. Instructions can be any directions, commands, or orders that can be stored in different forms, such as equipment-readable instructions, programming instructions including source code, and other communication signals and orders. Instructions can be used in a general sense and are not limited to machine-readable codes. One or more steps in various processes described herein may be performed by passing through instructions to one or more multiply-accumulate (MAC) units of the processors.

Figure 8:
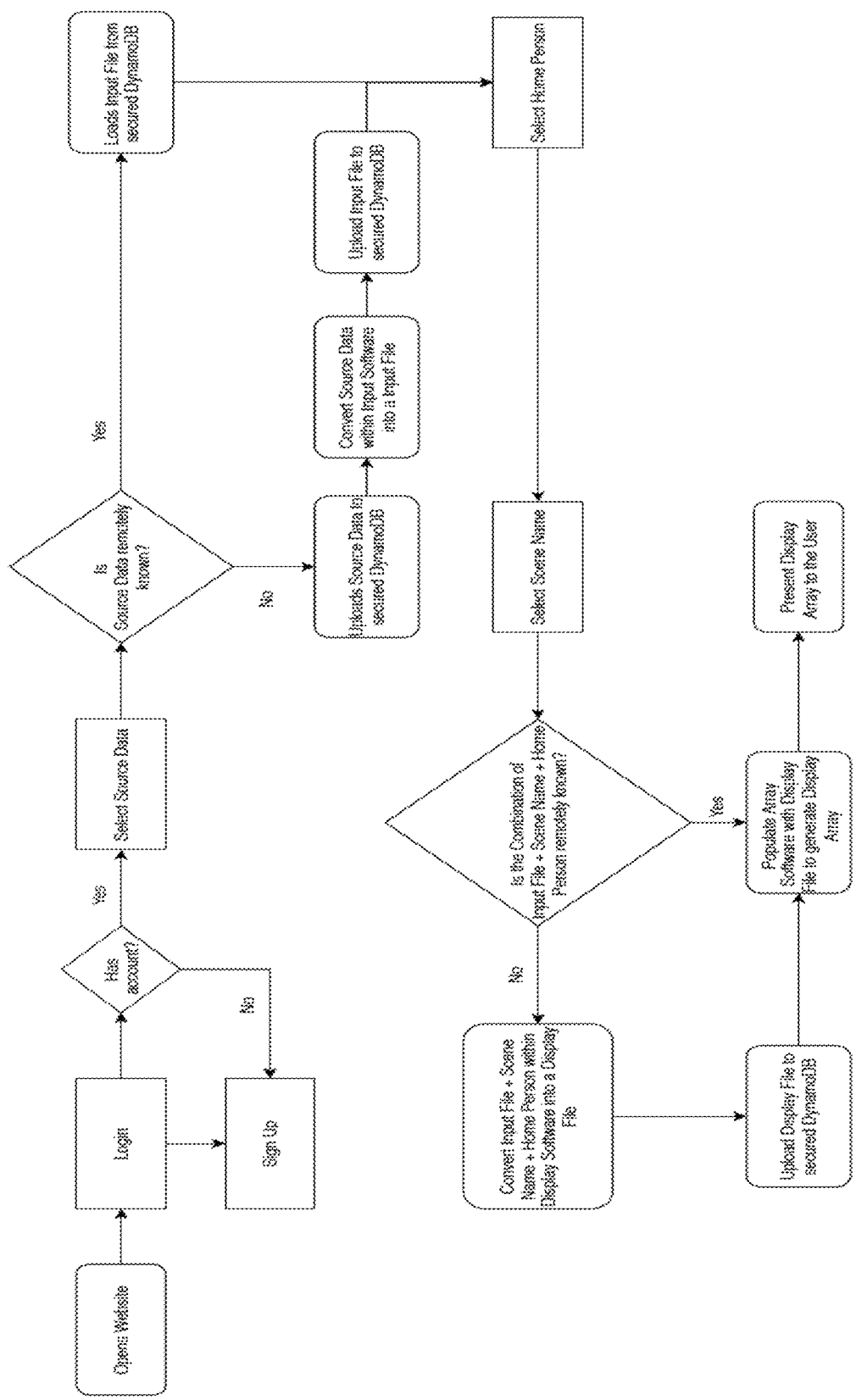
FIG. 8 provides a flow chart for a web-based implementation of a computer-assisted method for displaying chronological genealogical information.

The performance of certain operations may be distributed among more than one processor, not only residing within a single machine, but being deployed across a number of machines. In some embodiments, the one or more processors or processor-implemented modules may be located in a single geographic location (e.g., within a home environment, an office environment, or a server farm). In other embodiments, the one or more processors or processor-implemented modules may be distributed across a number of geographic locations, e.g., as schematically illustrated in FIG. 8. Even though in the specification or the claims may refer some processes to be performed by a processor, this should be construed to include a joint operation of multiple distributed processors.

The computer system may include a main memory and a static memory, which are configured to communicate with each other via a bus. The computer system further includes a graphical display unit (e.g., a plasma display panel (PDP), a liquid crystal display (LCD), a projector, or a cathode ray tube (CRT)). The graphical display unit controlled by the processors, displays a graphical user interface (GUI) to display one or more results and data generated by the processes described herein and to display the virtual space. The computer system also preferably includes an alphanumeric input device (e.g., a keyboard), a cursor control device (e.g., a mouse, a trackball, a joystick, a video game controller, a motion sensor, position sensor, instrumented gloves, instrumented headset, or other pointing instrument), a storage unit (a hard drive, a solid-state drive, a hybrid drive, a memory disk, etc.), a signal generation device (e.g., a speaker), and a network interface device, which are also configured to communicate via the bus.

The storage unit includes a computer-readable medium that stores instructions embodying any one or more of the methods and functions described herein. The instructions may also reside, completely or at least partially, within the main memory or within the processor (e.g., within a processor's cache memory) during execution of the instructions by the computer system. The main memory and the processor also constitute computer-readable media. The instructions may be transmitted or received over a network via the network interface device.

While computer-readable medium can be a single medium, the term "computer-readable medium" should be considered to include a single medium or multiple media (e.g., a centralized or distributed database, or associated caches and servers) able to store instructions. The computer-readable medium may include any medium that is capable of storing instructions for execution by the processors and that causes the processors to perform any one or more of the methods and features disclosed herein. The computer-readable medium can include, for example, data repositories in the form of solid-state memories, optical media, and magnetic media. The computer-readable medium does not include a transitory medium such as a propagating signal or a carrier wave.

A first embodiment of the methods described herein is a computer implemented method for creating a dynamic three-dimensional graphics display from genealogical family tree data, the method comprising the steps of:

(a) providing a genealogical family tree data set comprising biographical information on multiple individuals to a computer processing and memory device comprising software for input, processing, and display of information; wherein the biographical information concerning each individual comprises chronological information about when the individual lived or is living and information regarding the genealogical relationship of the individual to at least one other individual in the family tree data set;

(b) the software associating the biographical information of each individual in the family tree data set with a virtual three-dimensional icon (e.g., a cylinder, a regular polygonal prism, or an irregular shape such as a stylized image of a man or woman, and the like) for each individual;

(c) the software generating a three-dimensional genealogical data set by assigning coordinates for the position of each icon in a coordinate system consisting of orthogonal X, Y and Z dimensions, thereby defining a three-dimensional display array incorporating the X, Y and Z dimensions; wherein:

(i) the Z dimension is a time dimension covering a range of dates extending backward in time from the present date to a specified date in the past;

(ii) the X and Y dimensions comprise arbitrary units;

(iii) the software assigns a first Z coordinate value corresponding to a date of birth of the individual represented by the icon, and a second Z coordinate value corresponding to a date of death of the individual represented by the icon or the current date if the individual represented by the icon is currently living; wherein the first and second Z coordinate values define a position and length for each icon in the Z dimension;

(iv) the software assigns the X and Y coordinate values for each icon so as to avoid overlap of the icons in the three-dimensional array; and (v) the X and Y coordinates for each icon are assigned relative to X and Y coordinates of a home person designated by a user or by a default setting in the software;

(d) the software encoding the three-dimensional genealogical data set in a three-dimensional graphics display computer code to form a graphics display data set; and (e) the software displaying an image of at least a portion of the icons from the graphics display data set on a graphics display device in communication with the computer processing and memory device; wherein the image reflects the perspective of a viewer that is virtually present within a virtual space encompassing the display array, and the perspective of the image changes in real time in response to navigational inputs of a user.

In some preferred versions of the first embodiment, the icons are displayed in step (e) dynamically, in which the perspective of the displayed icons changes in real time in response to user input from a controller device such as a mouse or game controller. For web-based implementation, an online computing service such as AMAZON WEB SERVICES (AWS) can be utilized, which includes input modules such as LAMBDA and database storage modules such as DYNAMODB and S3, for encoding the coordinates for the icons and storing the resulting data sets, as well as software to generate a Display Array and presenting the Display Array for viewing, such as UNITY3D.

A second embodiment is the method of the first embodiment, wherein the date of birth is an approximate date of birth assigned to the individual represented by a particular icon when the biographical information for that individual does not include an actual date of birth or when the included date is obviously or logically erroneous (e.g., the date fails to meet certain logic tests, such as a parent being born after a child or siblings being born a century apart).

A third embodiment is the method of the first or second embodiments, wherein the date of death is an approximate date of death assigned to the individual represented by a particular icon when the biographical information for that individual does not include an actual date of death and does not indicate that the particular individual is still living or when the included data is obviously or logically erroneous (e.g., the data fails to meet certain logic tests, such as a mother dying at age 8 or an individual lifetime extending beyond age 115).

A fourth embodiment is the method of any one of the first through third embodiments, wherein the genealogical family tree data is provided by uploading from a genealogical database file, by accessing the data on a computer processing and memory storage device on which the data is native, by manually entering the biographical information, or a combination of two or more of the foregoing.

A fifth embodiment is the method of any one of the first through fourth embodiments, wherein the software assigns a variable alternate second Z coordinate value to individuals who were stillborn or who died in infancy or early childhood, wherein the alternate second Z coordinate value varies with the perspective of a displayed image in step (e) in order to give the icon of the individual who was stillborn or died in infancy or early childhood a minimum apparent height in the Z dimension in a given display perspective (e.g., providing a minimal height for infant and child icons to represent children who died before reaching some minimal age, such as age three or age five).

A sixth embodiment is the method of any one of the first through fifth embodiments, wherein shape of the icons is irregular or varies in the X and Y dimensions as a function of the Z coordinate values for the icons (e.g., the icons can be shaped as an hour glass, a bowling pin, a matryoshka doll, a stylized male or female figure, and the like).

A seventh embodiment is the method of any one of the first through sixth embodiments, wherein the X and Y coordinate values are assigned in step (c) by an algorithm that adjusts the X and Y coordinate values based on the number of icons being displayed in step (e) and/or based on one or more viewing options selected by the user.

An eighth embodiment is the method of any one of the first through seventh embodiments, wherein the biographical information further includes at least one name characteristic selected from the group consisting of a given name, a surname name, a nickname, and an indication that the name of the individual is not known.

A ninth embodiment is the method of any one of the first through eighth embodiments, wherein the biographical information further includes at least one characteristic selected from the group consisting of a place of birth, a place of death, a spouse name, a marriage date, a place of marriage, and a name for one or more children of the individual.

A tenth embodiment is the method of any one of the first through ninth embodiments, wherein the shape of each of the icons displayed in step (e) varies depending on the genealogical relationship of the icons to the home person and/or one or more other type of information present in the biographical information for the individuals represented by the icons (e.g., different shapes can be used for distinguishing genders, parents, grandparents, aunts/uncles, and more distant ancestors and collateral relatives from the root individual).

An eleventh embodiment is the method of any one of the first through tenth embodiments, wherein one or more lines or other shapes parallel to the Z axis are displayed along with the icons; and the line or other shape comprises Z dimension time markings, thereby acting as a reference for assessing the time period in which the individuals represented by the icons lived and/or the Z coordinate of a virtual viewer within the virtual space.

A twelfth embodiment is the method of any one of the first through eleventh embodiments, wherein the home person is assigned X, Y coordinate values of 0,0; and the X and Y coordinate values for the icons representing all other individuals to be displayed are assigned relative to X and Y coordinates of the home person based on the respective genealogical relationships of the other individuals to the home person.

A thirteenth embodiment is the method of any one of the first through twelfth embodiments, further comprising displaying tie-lines between icons representing specified degrees of genealogical relatedness between the individuals represented by the icons.

A fourteenth embodiment is the method of the thirteenth embodiment, wherein the tie-lines are styled to represent one or more relationships between the individuals represented by the icons selected from the group consisting of a spousal relationship, a sibling relationship, apostolic succession, and a parent-child relationship. In some cases, an individual may have one or more adoptive parents in addition to so-called birth parents, as well as adoptive and/or half siblings, all of which can be included within the genealogical data set as individuals of interest, and can be displayed in the virtual space, if desired, with different tie-line styles.

A fifteenth embodiment is the method of any one of the first through fourteenth embodiments, wherein the icons are assigned X and Y coordinate values and/or different shapes in response to selection or sort criteria, in order to foster clarity of display, to accommodate viewer preference, to facilitate display of familial genealogical relationships, or to display other defining characteristics of the individuals represented by the icons.

A sixteenth embodiment is the method of any one of the thirteenth through fifteenth embodiments, wherein each of the icons and tie-lines includes one or more display characteristics selected from the group consisting of a particular shape, a color, a fill pattern, text, an image, shading, a variation in brightness, a variation in color, bands of different colors, a variation in a fill pattern, bands of different fill patterns, a variation in shape, multiple shapes connected together, rotation along one or more axis within the virtual space, and vibration along one or more axis within the virtual space.

A seventeenth embodiment is the method of the sixteenth embodiment, wherein the display characteristics are selected based on one or more characteristics present in the biographical information of the individual represented by the icon, familial genealogical relationships between the individuals represented by the icons, or both.

An eighteenth embodiment is the method of any one of the first through seventeenth embodiments, wherein each icon comprises a single shape or a combination of two or more shapes displayed together in the virtual space, and each shape independently is selected from the group consisting of a two-dimensional shape and a three-dimensional shape.

A nineteenth embodiment is the method of the eighteenth embodiment, wherein the two-dimensional shape is selected from the group consisting of a circle, an oval, an ovoid, a polygon, a two-dimensional representation of a helix, a two-dimensional representation of a double helix, a two-dimensional representation of a male or female figure depending on the gender of the individual represented by the icon, and a two-dimensional graphic image representing some defining characteristic of the individual represented by the icon.

A twentieth embodiment is the method of the eighteenth embodiment, wherein the three-dimensional shape is selected from the group consisting of a cylinder, a rod with an oval cross-section, a rod with an ovoid cross-section, a prism with a polygonal cross-section, a three-dimensional representation of a helix, a three-dimensional representation of a double helix, a three-dimensional representation of a male or female figure depending on the gender of the individual represented by the icon, and a three-dimensional graphic image representing some defining characteristic of the individual represented by the icon.

In the eighteenth, nineteenth, and twentieth embodiments, each icon in the virtual space is renderable as a three-dimensional figure or as a two-dimensional figure if desired. The icons can have any shape, with any desired width or depth in the X and Y axes. Multiple icon shapes may be displayed at any one time. Each of the icons have a single shape in the virtual space or can be a combination of two or more shapes (e.g., a string of spheres, a sphere on top of a cylinder, a chain of interlocking links, a small regularly-proportioned male or female figure atop a rectangular or cylindrical pillar of the additional length needed to denote the correct lifespan, etc.), connected together in some manner, e.g., have surfaces that touch each other or being commented by a line, for example. Each shape can be independently selected from the group consisting of a two-dimensional shape, and a three-dimensional shape. Non-limiting examples of two-dimensional shapes include a circle, an oval, an ovoid, a polygon, a two-dimensional representation of a helix, a two-dimensional representation of a double helix, a representation of a male or female figure depending on the gender of the individual represented by the icon, and a two-dimensional graphic image representing some defining characteristic of the individual represented by the icon, such as a graphic representing a religion, an occupation, a country of origin, etc. Non-limiting examples of three-dimensional shapes include a cylinder, a rod with an oval cross-section, a rod with an ovoid cross-section, a prism with a polygonal cross-section (e.g., a triangular, square, rectangular, pentagonal, hexagonal, etc. cross section), a three-dimensional representation of a helix, a three-dimensional representation of a double helix, a three-dimensional representation of a male or female figure depending on the gender of the individual represented by the icon, and a three-dimensional graphic image representing some defining characteristic of the individual represented by the icon, such as a graphic representing a religion, an occupation, a country of origin, etc.

Similarly, icons of different shapes are displayable in the same virtual space, e.g., males and females may be displayed with different icon shapes to distinguish the gender of the individuals represented by the icons in the virtual space. Likewise, collateral relatives such as aunt, uncles, and cousins of different degrees may be displayed with different shapes or combinations of shapes.

A twenty first embodiment is the method of any one of the first through twentieth embodiments, wherein information such as names, dates, images, photographs, and/or other information from the genealogical family tree data set relating to an individual are displayable on any surface of the icon representing the individual, or are displayable in one or more pop-up display boxes or cut-scene windows, when an icon is selected by user input.

A twenty second embodiment is the method of any one of the twelfth through twenty first embodiments, wherein the icons and any tie-lines are displayable from any perspective outside or inside the region of the virtual space in which the group of icons is located (e.g., the user can view the entire group of icons from above, below, or to any side of the group, and the user can also look out from within the group of icons and see only those icons that are within the limits of a particular field of view).

A twenty third embodiment is the method of the twenty second embodiment, wherein the perspective and point of view are dynamically alterable to show a view that is to any extent upward, downward, leftward, and/or rightward in the virtual space relative to an initial perspective and point of view.

A twenty fourth embodiment is the method of the twenty third embodiment, wherein the displayed icons are scalable to show a selectable region of the virtual space defined by specified X, Y, and/or Z coordinate ranges.

A twenty fifth embodiment is the method of any one of the first through twenty fourth embodiments, wherein user-specified and user-modifiable placeholder icons are created for individuals of interest representing persons not included in the genealogical family tree data set whose names or other genealogical data may not be known and/or who may or may not have existed in the past or may or may not exist in the present.

A twenty sixth embodiment is the method of any one of the first through twenty fifth embodiments, wherein the software also encodes one or more displayable reference objects in the three-dimensional graphics display computer code, such as a reference scale, a reference plane, a reference volume or range, a reference section, and a reference point, is selectably displayed in the virtual space in any location, orientation, shape, color, marking, degree of transparency, or in any other manner.

A twenty seventh embodiment is the method of the twenty sixth embodiment, wherein the reference object includes displayable indicia selected from any defining characteristics of the individuals of interest in the genealogical family tree data set, or other indicia selected by a user, such as a date, a date range, an event, a duration of an event, a life span of an individual of interest, and a familial line of decent.

A twenty eighth embodiment is the method of any one of the first through twenty seventh embodiments, wherein the graphic display device is one or more devices such as a computer display, an electronic tablet, a cellphone, a television, video game display, electronic eyeglasses, an ocular headset, a three-dimensional virtual reality display device, a spatial computing device, a wristwatch display, a wristband display, or other wearable display.

A twenty ninth embodiment is the method of any one of the first through twenty eighth embodiments, wherein the genealogical family tree data set includes or is augmentable by the user to include one or more additional items of information such as additional individuals of interest, genealogical information, ethnicity information, genetic information, haplogroup relationships, genetic linkage information, genetic mapping information, genetic distance information, historical information, an audio voice recording, a music file, a video file, a still image file, a graphic image file, and or any other type of information or defining characteristic that can be included in the genealogical family tree data set.

A thirtieth embodiment is the method of any one of the first through twenty ninth embodiments, wherein user selectable information is displayable on the display device via popup windows, dropdown menus, rollovers, labels, icon badges, other badges, borders, banners, split screens, cut screens, and other manners of display.

A thirty first embodiment is the method of any one of the first through thirtieth embodiments, wherein the user can specify which of the icons are displayed, e.g., the user can selectively display, or remove from a display, icons representing specific individuals, subgroups, or classes of individuals such as aunts of any degree, uncles or any degree, cousins of any degree, parents and/or children of individuals, individuals related only by marriage, males, females, individuals from a selected country of birth, individuals that were born or died within a particular date range, or any other category, at any desired generational or chronological level.

A thirty second embodiment is the method of any one of the first through thirty first embodiments, wherein the individuals are humans, horses, dogs, cats, members of a managed species, other animals, plants, viruses, protozoa, bacteria, fungi, archaea, or chromists.

A thirty third embodiment is the method of any one of the first through thirty second embodiments, wherein the virtual space is populated with, decorated with, or otherwise comprises one or more representations such as objects, vistas, geographic effects, background effects, aerial effects, airborne effects, atmospheric effects, and sound effects, so as to appear as a virtual world or worlds, and wherein the representations are variable based on user input, user selection, or programmed defaults, or responses to navigation through the virtual space by a user, based on any characteristic or parameter in the three-dimensional graphic display data set.

A thirty fourth embodiment is the method of any one of the first through thirty third embodiments, wherein the user is represented by a dynamically movable, navigable avatar icon, which may be an arrow or another position indicator of a computer mouse, in the virtual space.

A thirty fifth embodiment is the method of the thirty fourth embodiment, wherein the navigable avatar icon comprises a representation of a vehicle, an aircraft, a pictorial representation of a user, a flying animal such as a bird, a magic carpet, or any other means of locomotion or virtual transport or any combination thereof. The navigable icon is distinct from any icon in the family tree display that represents the user as a member of a family in the data set. For example, the navigable icon can include an image of the user "riding" on a magic carpet, an airplane, or other means of transportation, if desired.

A thirty sixth embodiment is the method of any one of the first through thirty fifth embodiments, wherein the virtual space includes position indicating and informational aids such as maps, altitude indicators, navigation bars, compass icons, and other aids to assist the user in moving through the virtual space.

A thirty seventh embodiment is the method of any of the first through thirty sixth embodiments, wherein a search capability is provided to facilitate locating a particular icon within the virtual space and the search results include facing the navigable user avatar icon toward the located icon, moving the navigable user avatar icon toward the located icon, highlighting the located icon with an arrow or other indicator, causing the located icon to flash or change color, or any or all of these.

A thirty eighth embodiment is the method of any one of the first through thirty seventh embodiments, wherein the method is configured as an interactive video game.

In the method embodiments described herein, software for generating the three-dimensional graphics display computer code can be generated by a person of ordinary skill in the 3D graphics programming arts using any available graphic computer language, graphics software engine, computer game engine, or other computer programming tool, such as, for example, VIRTUAL REALITY MODELING LANGUAGE (VRML), DIRECT3D (a subset of DIRECTX), GLIDE, MANTLE developed by AMD, METAL developed by Apple, OPENGL, OPENGL SHADING LANGUAGE; OPENGL ES 3D API for embedded devices, QUICKDRAW 3D developed by Apple Computer starting in 1995, abandoned in 1998, RENDERMAN, VULKAN, LIBGCM, ANGLE, WEB BROWSERS GRAPHICS ENGINE which is a cross-platform version of the OPENGL WRAPPER for the web, Web-based API, WEBGL—a JAVASCRIPT interface for OPENGL-ES-2.X API promoted by Khronos, HIGH-LEVEL 3D API, BGFX, CLANLIB, CRYSTAL SPACE, HOOPS 3D GRAPHICS SYSTEM, HORDE3D, IRRLICHT ENGINE, JAVA 3D, JAVA FX, JT OPEN from Siemens PLM Software, MAGNUM, MOBILE 3D GRAPHICS API (M3G; JSR-184), OGRE, OPENGL PERFORMER, OPENSG, QSDK, GENIVI RAMSES, RENDERWARE, ZEA ENGINE, UNIGINE, VTK, A-FRAME, BLEND4WEB, COPPERLICHT, STORMENGINEC, THREE.JS, VERGE3D, X3DOM, STAGE3D in the 3D library in FLASH version 11 and later, BLENDER, PAPERVISION3D, AWAY3D for FLASH, GODOT, UNREAL ENGINE, URHO3D, UNITY 3D, CRYENGINE, PANDA3D, BABYLON.JS, LIBGDX, STRIDE, ARMORY 3D, JMONKEY3, O3DE (previously LUMBERYARD), UDK, PLAYCANVAS, APPGAMEKIT 2.0, ESENTHEL, ROBLOX, TORQUE3D, WAVE, SOURCE, Havok, BLITZ3D, LEADWERKS, SPRING ENGINE, and GAMEGURU.

Optionally, to facilitate printing of a two-dimensional family tree chart, all of the icons can be centered at the same value of Y, such that the icons are laid out in the X-Z plane in the display of the virtual space. When all icons are assigned the same Y value, the display looks like a typical family tree ancestor chart depiction (oriented either vertically or horizontally), except that the icons for each generation are positioned in the time dimension (Z) and the icons have an apparent length proportionate to the life span of the individual represented by the icon. As such, the user/viewer will see the icons laid out in a manner similar to that shown in FIG. 3. This embodiment of the display view is particularly useful for printing out on a flat medium an ancestor family tree poster that includes the time dimension.

Figure 2:
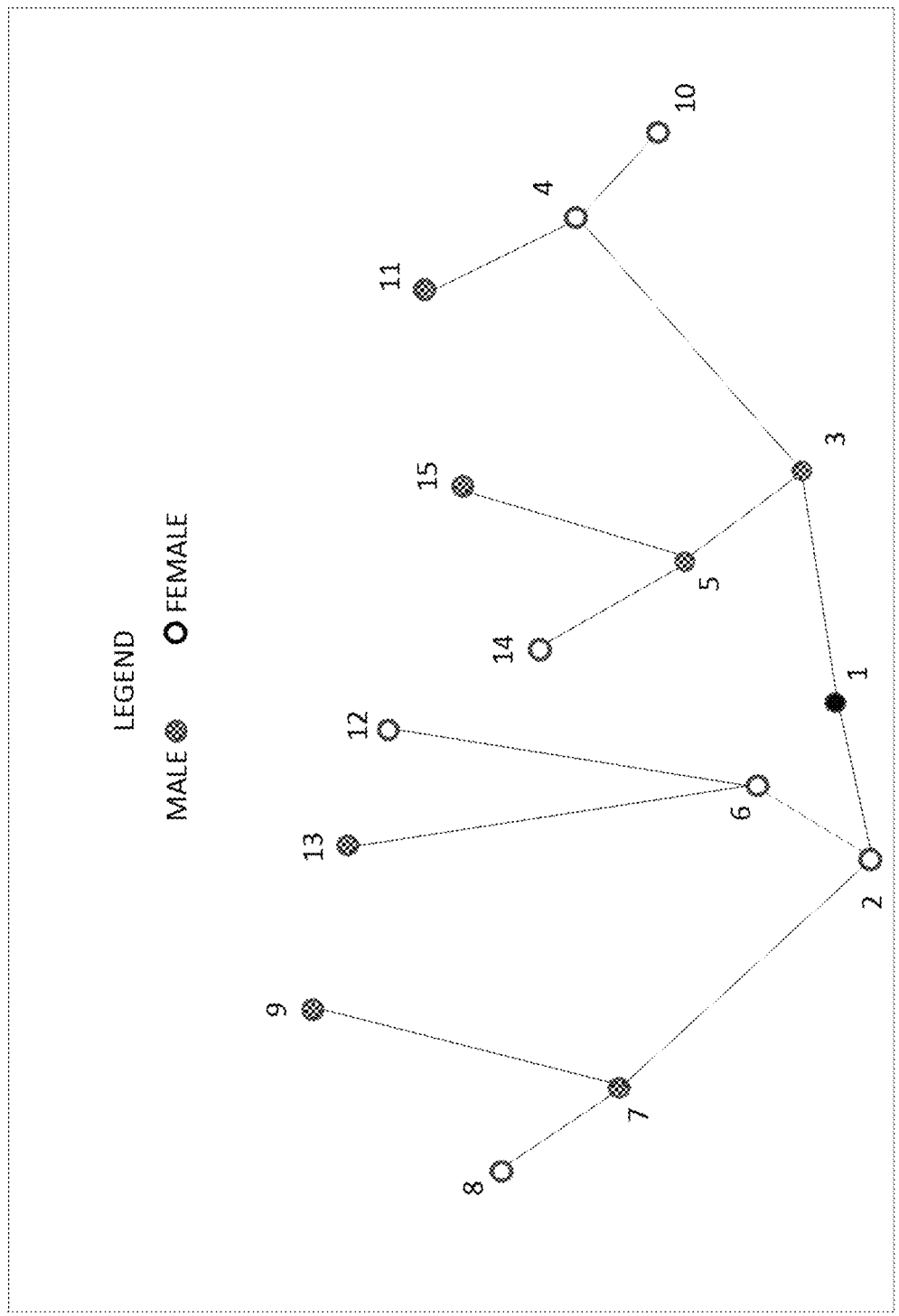
FIG. 2 provides a top view of the virtual space shown in FIG. 1, looking down the Z axis onto the X-Y plane, which illustrates the distribution of the icons in the X and Y dimensions.
Figure 3:
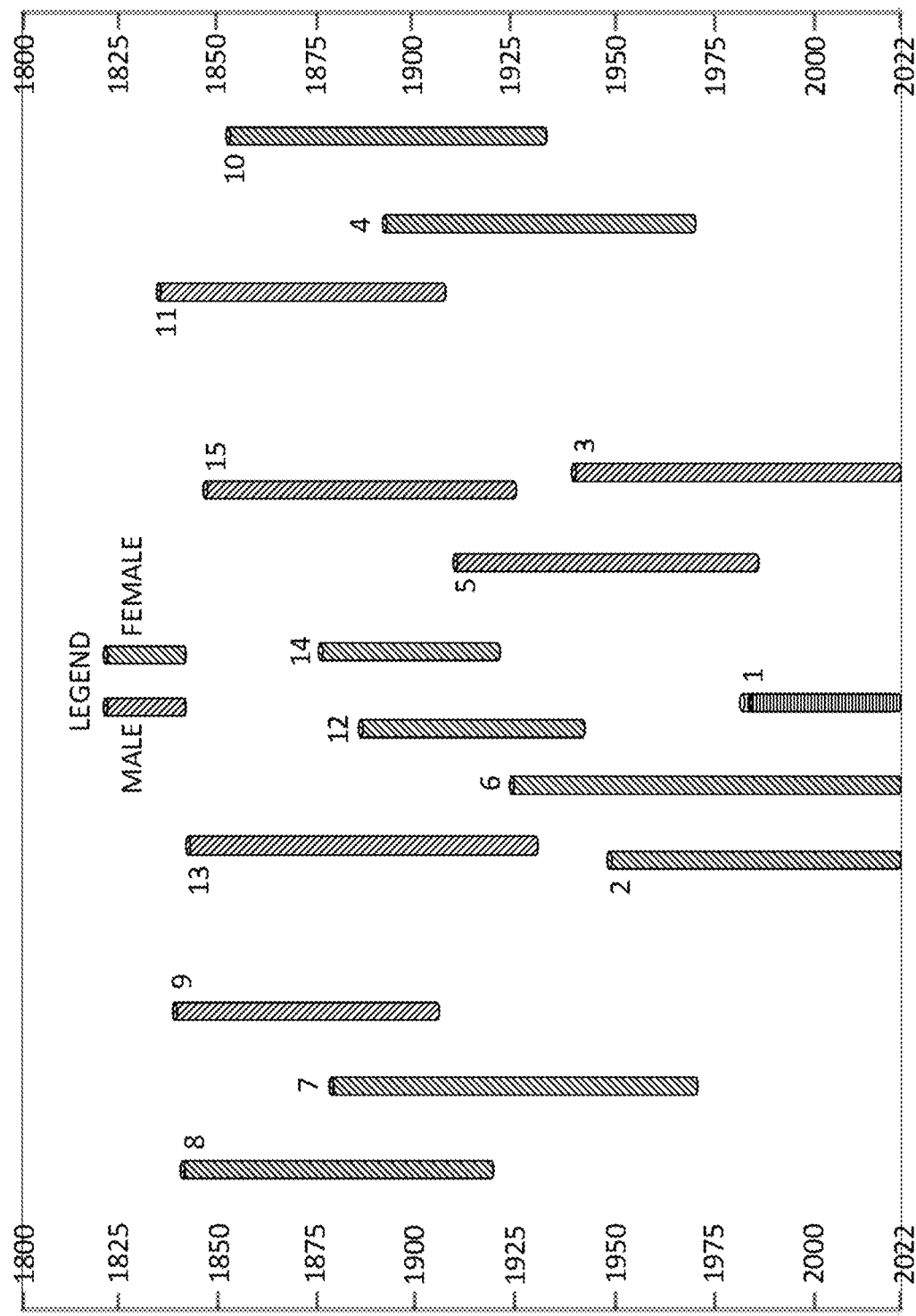
FIG. 3 schematically illustrates distribution of the generations in the virtual space shown in FIG. 1, looking down the Y axis onto the X-Z plane, which illustrates the distribution of the icons in the X and Z dimensions.

Although many of the examples discussed herein display the time dimension (Z) in the vertical orientation with respect to the display screen, as in FIGS. 1, 2, and 3, it is of course possible to display the time dimension in either the direction of the width of the display screen or back into the virtual space in a direction perpendicular to the plane of the display screen.

It is understood to those of skill in the art that cartesian coordinates are interchangeable with other coordinate systems, such as polar, cylindrical, and spherical coordinate systems, in that the coordinates from one system can be uniquely converted to coordinates in the other systems, to the extent that they all relate to three-dimensional space. Consequently, in any embodiment of the methods described herein, polar, cylindrical, and spherical coordinates and any hybrid thereof may be interchangeably used in place of orthogonal XYZ coordinates in the underlying software code to delineate the relative positions of the icons in the three dimensional virtual space.

In some embodiments, family tree data is imported from a GEDCOM file, which is a standard file format for exchanging genealogical data between different systems. A GEDCOM file consists of a header section, records, and a trailer section. Within these sections, records represent people (INDI record), families (FAM records), sources of information (SOUR records), and other miscellaneous records, including notes. Every line of a GEDCOM file begins with a level number where all top-level records (HEAD, TRLR, SUBN, and each INDI, FAM, OBJE, NOTE, REPO, SOUR, and SUBM) begin with a line with level 0, while other level numbers are positive integers.

Alternatives to the standard GEDCOM file include EVENT-ORIENTED GEDCOM (also known as "EVENT GEDCOM" and originally called INTERGED, developed by Commsoft, and GRAMPS XML, which is an XML-based open format created by the open source genealogy project Gramps and used also by PHPGEDVIEW. a PAF file, a GENEWEB GW file, a WEB FAMILY TREE WFT file, a THE MASTER GENEALOGIST TMG file, a THE MASTER GENEALOGIST PJC file, a CSV file, a LEGACY FAMILY TREE FDB file, a FAMILY TREE MAKER FTW file, a ROOTSMAGIC RMG file, and the like. Preferably, the information in the three-dimensional data set can also be exported in a file in one or more of the file formats described above.

In any of the method embodiments, logical searches can be performed to select subsets of information in the genealogical data set, and the search results displayed, e.g., in a results list, with hyperlinked connection to individual search results. Optionally the search results can be displayed in a separate window so that navigation between individual results and the list of results is facilitated.

Optionally, preloaded and updatable historical event content and/or user-generated historical event content can be displayed from any point in recorded history or prehistoric information. In addition, information relating to an individual optionally can be displayed in a language and a character set selectable by a user, including, but not limited to hanzi characters, kanji characters, Chinese characters, Cyrillic characters, Greek characters, Thai characters, or any other character set currently or historically in use. Other optional features include, without limitation: data driven dimensions for the X and Y axes and 3000 B.C. limit for the Z axis; choice of backgrounds for the virtual space, such as blue sky with clouds, plain gray, black sky with stars, or tiled user photo; user selectable avatar stands on a magic carpet, has a fixed pointer shaped like a magic wand in front of him; a user's pointer can select items to click on for details or interaction; a user can "fly" unconstrained at any speed in any direction, with hovering for any length of time; a 3D mini map icon can be included in the virtual space (e.g., in a corner) for navigation, with a clickable on/off feature to bring up a larger navigation map; a digital year counter ("altimeter") visible within the screen view of the virtual space; vertical compass rose lines appear on the horizon calibrated as a 12-hour clock; translucent vertical compass bars and/or a flat compass rose available for navigation; other optional landmarks of any kind in the 360-degree horizon background to help indicate the direction in which the user is looking within the virtual space; icons comprising a normally-proportioned person standing on a pedestal (e.g., human icons default to pink/blue for female/male and the pedestal icon portion defaults to color of country of birth); stylized icon human faces can be replaced with photos or images; names and data can be written on the icon pedestals and/or visible by pointer rollover or click; audio, video, text, and other interaction with icon is enabled with and without cut scenes; the ability to go to cut scenes when interacting with icons; history reference planes that are color coded for each continent and combination of continents; translucent history reference planes that color the view while the user is within them; historic photos or drawings/images pop up while user is within a history reference plane; the degree/amount of history data displayed is user-selectable; reference planes can toggle on and off; pop-up windows for historical information interaction; and split screen views.

A thirty ninth embodiment is a computerized system for converting genealogical family tree data into a three-dimensional graphics display, comprising at least one computer processing and memory device comprising at least one memory element and at least one computer processor programed with software code for implementing the method of any one of the first through thirty eighth embodiments; and a display device in communication with the computer processing and memory device configured to display the icons of at least a portion of the individuals of interest in the display data set in the three-dimensional virtual space.

A fortieth embodiment is the system of the thirty ninth embodiment, further comprising an input device in communication with the computer processing and memory device, for inputting additional information, queries, and/or instructions to augment information in the genealogical family tree data set, and/or to alter the display of the virtual space (e.g., to change the appearance on a display device, such as scale, perspective, etc.).

A forty first embodiment is the system of the fortieth embodiment, wherein the input device is one or more wired or wireless device such as a keyboard, a computer mouse, computer touchpad, a scroll wheel, a track ball, a video game controller, a joystick, a trigger, a touch screen, a remote control device, an electronic tablet, a microphone for voice command input, a motion sensor, a tilt sensor, an accelerometer, a position sensor, a weight sensor, a push button, a video game controller, or a wearable virtual reality controller such as a headset or a glove, which is operable locally or remotely through internet or other online connectivity.

A forty second embodiment is the system of any one of the first through the thirty ninth embodiments, wherein the display device is one or more wired or wireless devices such as a computer display, an electronic tablet, a cellphone, a television, video game display, a holographic display, electronic eyeglasses, an ocular headset, a three-dimensional virtual reality display device, a spatial computing device, a wristwatch display, a wristband display, or other wearable display or other display device.

A forty third embodiment is the system of any one of the thirty ninth through forty second embodiments, further comprising a wired or wireless audio output device, such as a speaker, a headphone, ear buds, a headset, an electronic tablet, a cellphone, a television, and video game sound system.

A forty fourth embodiment is the system of any one of the thirty ninth through forty third embodiments, wherein at least a portion of the device is part of an online or remote computing system, including thick client, thin client, and other remote computing systems.

In the thirty ninth through forty fourth embodiments, the system can be a self-contained computer, a networked system comprising host and client computing systems, or can be implemented in multiple formats as both a self-contained computer and a network hosted computer with one or more client computers. The one or more client computers of a hosted system can allow for real-time interaction between multiple users, for example, one user guiding another user through a family history display, along with real time conversations between the users either through text or voice communication. Cameras can be integratable with the system to allow multiple users to see one another, or to facilitate a virtual reality environment (e.g., by using tracking cameras to allow the perspective of the view to alter based on movement of the head or body), if desired.

For example, the system can be implemented in a system environment including client devices, e.g., one or more electronic devices capable of receiving user input as well as transmitting and/or receiving data via a network or from a resident computer. Example electronic devices include desktop computers, laptop computers, video game players, personal digital assistants (PDAs), smartphones, tablets, wearable electronic devices (e.g., smartwatches), smart household appliance (e.g., smart televisions, smart speakers, smart home hubs), Internet of Things (IoT) devices or other suitable electronic devices. In the case of a networked system, a client device communicates to other components via the network. Networked users may be customers of a computing server or any individuals who access the system of the computing server, such as an online website or a mobile application. In the case of a non-networked resident computer, the user is anyone with access to the computer.

In a networked system, a first user may grant a second user full access to the first user's account and the second user will have access to the first user's information. In one embodiment, a client device executes an application that launches a graphical user interface (GUI) for a user of the client device to interact with the computing server. The GUI may be an example of a user interface. A client device may also execute a web browser application to enable interactions between the client device and the computing server via the network. In another embodiment, the user interface may take the form of a software application published by the computing server and installed on the user device. In yet another embodiment, a client device interacts with the computing server through an application programming interface (API) running on a native operating system of the client device, such as IOS or ANDROID. In yet another embodiment, the software program is loaded onto a client device from a CD-ROM, USB memory or some other non-transitory computer readable medium.

The network can provide connections to the components of the system environment through one or more sub-networks, which may include any combination of local area and/or wide area networks, using both wired and/or wireless communication systems. In one embodiment, a network uses standard communications technologies and/or protocols. For example, a network may include communication links using technologies such as ETHERNET, 802.11, worldwide interoperability for microwave access (WiMAX), 3G, 4G, LONG TERM EVOLUTION (LTE), 5G, code division multiple access (CDMA), digital subscriber line (DSL), etc. Examples of network protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network may be represented using any suitable format, such as hypertext markup language (HTML) or extensible markup language (XML). In some embodiments, all or some of the communication links of a network may be encrypted using any suitable technique or techniques such as secure sockets layer (SSL), transport layer security (TLS), virtual private networks (VPNs), internet protocol security (IPsec), etc. The network also includes links and packet switching networks such as the Internet.

One or more computer processors within the system perform various tasks following programmed instructions for performing the methods described herein. Depending on the embodiments, a processor may also be referred to as an online server, a personal genetic service server, a genealogy server, a family tree building server, and/or a social networking system. The computer processor(s) may analyze the data to generate results regarding the various individuals represented in the genealogical data set. The results may include calculated relationship information between selected individuals or groups of individuals, such as cousin relationships, and aunt and uncle relationships of any selected degree of relatedness, grouping of individuals be ethnicity, country or origin, country of residence or citizenship, paternal and maternal genetic relationships, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computer processor(s), whether networked or resident in a stand-alone computer, may present or cause the user interface to present the results to the users through a GUI displayed at the client device of a networked system on the display of a stand-alone computer system. The results may include graphical elements, textual information, data, charts, and other elements in addition to family trees. In some embodiments, any information in the data set or in any supplemental content such as historical audio or visual files, popup menus, visual effects, or any other element of the virtual space can be indexed to one or more individuals, where appropriate, and/or can be indexed to a time scale, a reference plane, a reference point, a date, and the like.

A user interface on a stand-alone computer or controlled by or in communication with the computing server may display the individuals in a list or as a three-dimensional family tree such as in the form of a three-dimensional pedigree chart or other form as described herein. In one embodiment, subject to user's privacy setting and authorization, a computing server may allow information generated from a user's genealogical data set to be linked to another user profile and to one or more of different family tree data sets. Users may also authorize the computing server to analyze their genetic data and/or their genealogical data set and allow their information to be discovered by other users.

Genealogical data is stored in non-transitory memory devices and may include various types of data that are related to tracing family relatives of users. Examples of genealogical data include names (first, last, middle, suffixes, titles, etc.), gender, birth locations, date of birth, date of death, death location, marriage information, dates and places of life events (e.g., birth, death, religious rites, migration, naturalization, etc.), stories, anecdotes, narratives, relationship information, and other vital data.

In addition to user-input data, genealogical data may also take other forms that are obtained from various sources such as public records and third-party data collectors. For example, genealogical records from public sources include birth records, marriage records, death records, census records, court records, probate records, adoption records, obituary records, etc. Such information can be imported from an online portable memory source or manually input. Likewise, genealogical data may include data from one or more of the Ancestry World Tree system, a Social Security Death Index database, the World Family Tree system, a birth certificate database, a death certificate database, a marriage certificate database, an adoption database, a religious institution database or records, a draft registration database, a veterans database, a military database, a property records database, a census database, a voter registration database, a phone database, an address database, a newspaper database, an immigration database, a family history records database, a local history records database, a business registration database, a motor vehicle database, and the like.

Additionally, the genealogical data can include relationship information inferred from the genetic data either stored within the genealogical data set, or available from a genetic database source.

Typical hardware for a user or client station or stand-alone computer system includes: a PC or gaming device with a display device (e.g., a computer screen or other display device descried herein), and a keyboard with arrow keys and/or a two-button mouse with a scroll wheel or a video game controller. Optionally, the system can include movement controls (e.g., that will function if an icon has not been "selected"), including an interactive camera to view and control movement in the virtual space, joy sticks, keyboard functions, and the like. The view from such an interactive camera can be divorced from the position of the navigable icon in the virtual space so that the user can pan, tilt, and zoom the screen view while not changing the position of the navigable icon, as would be the case when a video game player "looks around" in the virtual world while not changing the point at which his gun was aiming. For example, the movement controller can allow a user to look left and right by moving the mouse left and right, look up and down with the scroll wheel, move left and right with the Left and Right arrow keys, move forward or backward with the Up and Down arrow keys, move straight up and down with the D and U keys; zoom in and out with the I and O keys; and left click with mouse cursor to "select" an icon. Icon Interaction Controls can be included to function when an icon has been "selected". A preferred movement control device is a video game controller with at least two joysticks or thumbsticks and at least four pushbuttons.

A forty fifth embodiment is a non-transitory computer-readable medium storing instructions that when executed by a computer processing and memory device cause the computer processing and memory device to perform the method of any one of the first through thirty seventh embodiments.

A forty sixth embodiment is the non-transitory computer-readable medium of forty fourth embodiment, wherein the non-transitory computer-readable medium is a medium such as a hard drive, a remote server, a DVD ROM, a CD ROM, an SD memory card, an optical disk, a USB storage device, a solid state drive, a redundant array of independent disks, a storage area network, or a cloud storage medium, including, e.g., a server of an online genealogical service.

A forty seventh embodiment is an article of manufacture comprising a non-electronic physical representation of at least a portion of the virtual space displayed in the method of any one of the first through thirty sixth embodiments.

A forty eighth embodiment is the physical representation of the forty seventh embodiment, wherein the representation is selected from a paper printout, a printed image, a three-dimensional printed model, a fabricated model, a molded article, a cast article, and a sculpted article (e.g., for suspended display in the air such as a mobile or other hung display, or for display on a surface such as a table, floor, or ground).

Referring now to the drawings, FIGS. 1, 2, 3, and 4 are provided to aid in understanding the distribution of the icons in all three dimensions, and also illustrate the power of including a time-dimension in the display to visually connect individuals with the time period in which they lived. FIG. 1 illustrates four generations of a family in an isometric rendering of a virtual space covering the time period from a date in 2022 back to Jan. 1, 1800. Three generations of direct ancestors ascending from the icon labeled 1 (the home person in this case) are displayed in the virtual space, and four timescales in the corners of the isometric view of the virtual space offer chronological reference. The right-to-left dimension in this rendering is the X dimension, the front-to-back dimension is the Y dimension, and the vertical (up/down) dimension is the Z dimension (time). The icons farther back in the Y dimension appear smaller (i.e., the time dimension, Z, and the width dimension, X, appear diminished) than the icons toward the front in the Y dimension, which reflects the isometric perspective shown in the drawing. The males and females are differentiated by different fill patterns as shown in the legend. The home person in this rendering is not assigned to a specific gender. The direct ancestors of the home person are assigned numbers as follows with respect to their relation to the home person 1: individuals 2 and 3 are father and mother, respectively; individual 4 and 5 are paternal grandparents; individuals 6 and 7 are maternal grandparents; individuals 8 and 9 are maternal great grandparents (specifically, the parents of maternal grandfather 7); individuals 10 and 11 are paternal great grandparents (specifically, parents of paternal grandmother 4); individuals 12 and 13 are maternal great grandparents (specifically the parents of maternal grandmother 6); and 14 and 15 are paternal great grandparents (specifically, the parents of paternal grandfather 5). The icons of the individuals living at the most recent date represented in the virtual space the touch X-Y plane representing the bottom of the display. In this rendering, relatively horizontal spousal tie-lines connect spouses, while vertical parent-child tie-lines extend from the spousal tie-lines to the children.

FIG. 2 provides a top view of the virtual space shown in FIG. 1, looking down the Z axis onto the X-Y plane, which illustrates the distribution of the icons in the X and Y dimensions. Tie-lines are omitted in the view.

FIG. 3 provides a front elevation view of the virtual space of FIG. 1, illustrating the distribution of the generations in the virtual space shown in FIG. 1, looking down the Y axis onto the X-Z plane, which illustrates the distribution of the icons in the X and Z dimensions.

Figure 4:
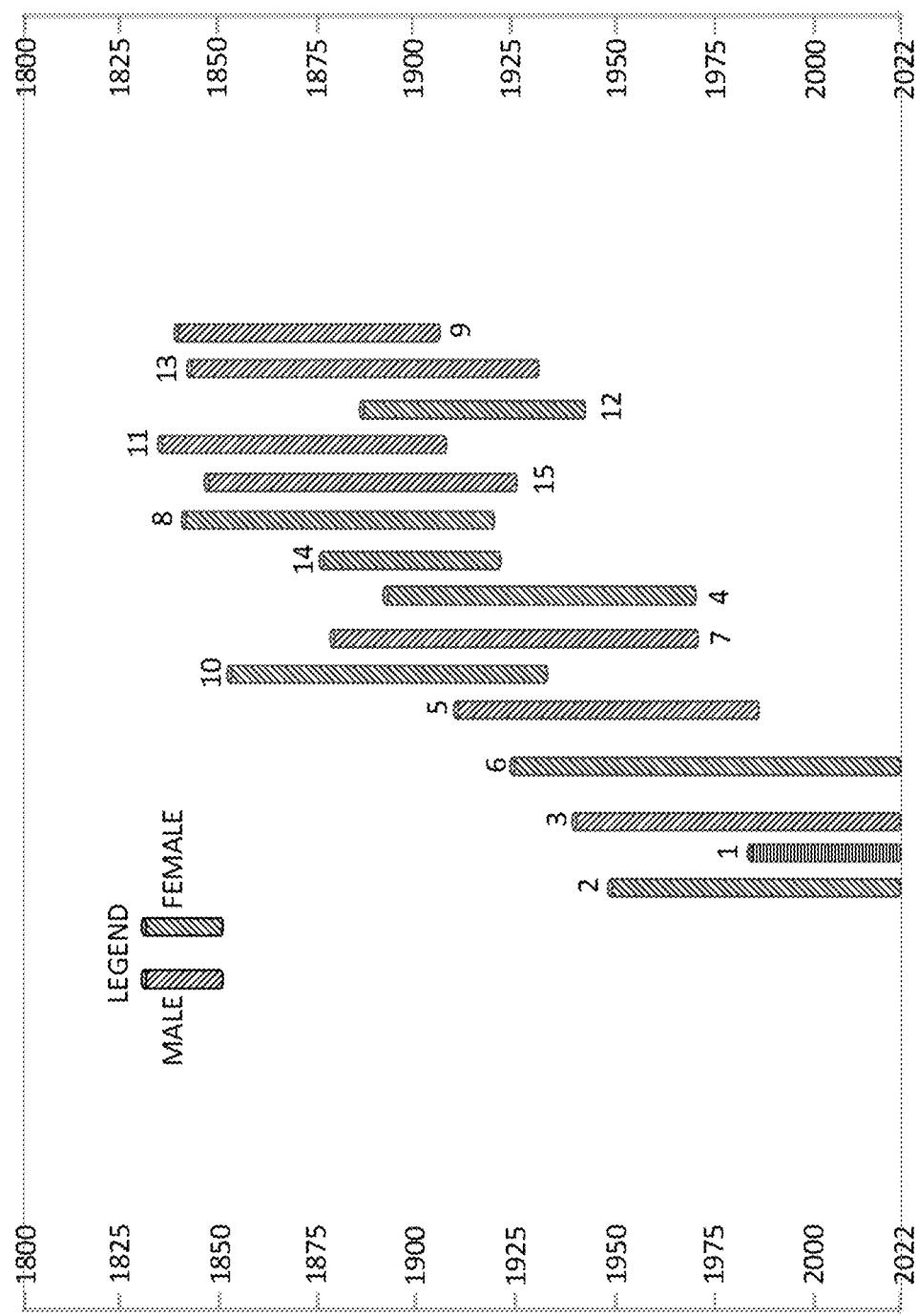
FIG. 4 schematically illustrates distribution of the generations in the virtual space shown in FIG. 1, looking down the X axis onto the Y-Z plane, which illustrates the distribution of the icons in the Y and Z dimensions.

FIG. 4 provides a side elevation view of the virtual space of FIG. 1, illustrating the distribution of the generations in the virtual space shown in FIG. 1, looking from the X axis onto the Y-Z plane, which illustrates the distribution of the icons in the Y and Z dimensions.

Tie-lines are omitted in the views presented in FIGS. 3 and 4 for clarity. The lifespans of the displayed individuals are readily apparent in FIG. 3 and FIG. 4. For example, maternal grandfather 7 lived for approximately 91 years, i.e., from approximately 1880 to 1971. As is also evident, the home person 1, his or her mother 2, and maternal grandmother 6 were all still living in 2022, while all other ancestors were deceased at that time. Similarly, FIG. 3 and FIG. 4 also allow the user to see that ten direct ancestors of home person 1 were living in 1900 (individuals 4, 7, 8, 9, 10, 11, 12, 13, 14 and 15), while six great grandparents of home person 1 (individuals 8, 9, 10, 11, 12, and 15) were living in 1873 and could have been affected by the United States financial crisis that began in that year.

In any of the embodiments described herein, the viewing perspective of the user can be either from "outside" a group of displayed icons, thereby viewing the icons as if they were all inside a "fishbowl" or "aquarium," or from "within" and among a group of icons as if from within a forest. Preferably, user input allows zooming in and/or out to increase or decrease the apparent field of view, which will vary the apparent sizes and/or relative positions of the icons within the field of view. From a viewing position outside the group of icons, the viewer preferably can selectively: (i) move around the entire icon group at any point on a sphere of any radius, (ii) move up and down the along Z axis, (iii) move left and right along the X axis, (iv) move back and forth along the Y axis, (v) look left, right, up, or down from any point on any axis, (vi) move closer to or further away from the icon group, and/or (vii) any simultaneous combination thereof, if desired. From a viewing position inside the group of icons, the viewer preferably can: (i) move through the icons as if they were transparent, (ii) move up and down along the Z axis, (iii) move left and right along the X axis, (iv) move back and forth along the Y axis, (v) look around 360 degrees in any direction from any point, (vi) look left, right, up, or down from any point on any axis, and/or (vii) any simultaneous combination thereof, if desired.

In some embodiments, the viewing orientation or perspective is integratable with a simulated view of the user's actual physical surroundings or with a simulated view of some entirely artificial environment, so as to enhance the view of the surroundings and produce an augmented version of reality for the user. In some embodiments, user input partially determines what happens in the environment so as to produce a virtual version of reality for the user.

The method described herein can show ascending and descending lineal relationships and collateral relationships at the same time, at the selection of a user, which means that all of the home person's direct ancestors, as well as the home person's aunts and uncles and cousins of any degree, including those who are living, can be displayed if the user so desires.

The present method also provides for displaying placeholder icons for family members not yet identified by name, and/or for hypothetical family members. For example, the names of all 32 of great-great-great grandparents of a given individual may not be known, since records may be incomplete or research on particular family lines may be incomplete.

Any or all of these unnamed individuals are displayable within the virtual space, should the viewer desire to see them represented, as would be the case where the user wants to visualize a home person's full six-generation family tree in three dimensions.

The present method also provides for displaying placeholder icons for unknown relatives of a home person, who may or may not exist (e.g., cousins of any degree, siblings, spouses, and aunts/uncles of any degree) by including hypothetical spouses and children of a given individual within the data set. For example, the typical living home person may have many living fourth cousins who have not been specifically identified in the data set, but who are nonetheless directly or collaterally related to a given home person in the data set. For example, the home person's 16 great-great grandparents may well have given rise to unknown third cousins, and so on. The method can be used to generate icons for such potential family members descended from both named and unnamed ancestors by assuming that children were born in each succeeding generation and assigning some default values for birth date and death dates, where appropriate (assigning a death date to any unknown individual that was born more than some threshold period of time in the past, e.g., 70 or 80 years). Seeing placeholder icons for unknown cousins who might be a phone call away could encourage the viewer to do additional genealogical research to try to associate some actual names with those placeholder icons.

The present method can also be applied to data which is partly or wholly fictional or imagined, such as that involving characters in a novel, a movie, or a television series. Thus, as used herein, the term "individual" can refer to a real-life individual, a fictional or hypothetical individual.

In addition, all of the icons may be rotatable, and/or surfaces of the shapes may be decorated in any manner and may display photos, maps, or other images. All parameters may be logic driven. The icons, tie-lines and any other element within the virtual space optionally can respond to input from a user, such as computing device mouse rollovers or clicks or screen touches or other user inputs in order to change views, display information, select a new home person, trigger dropdown menus, popup windows, audible menus, and the like.

Family relationships not explicitly included in the available genealogical data, such as who is a second cousin of whom, are derived and made available as information for the user. Relationships between historical information and the genealogical data, such as who was born during the Crimean War, are also derivable from the data set and are available as information for the user. Both the available data and the derived information can serve as the basis for other operations or functions within the virtual space.

In any of the embodiments described herein, the icons or the surroundings of the virtual space can include features such as highlights, colors, flashes, blinks, reference planes and ranges, scales, legends, and other indicators in the display to convey information or accent data which the viewer might like to focus on at any given time. For example, the icons of all of the people born in Ireland could be set to appear in green, tie-lines among all third cousins could be shown as flashing orange dotted lines, a maternal line could be highlighted, or a thin, partially transparent reference plane centered on Nov. 11, 1918 could be added on the vertical time scale to help point out which family members were living on Armistice Day.

The icons and surroundings of the virtual space can also include voice synthesis and/or audio recordings of both entered data and derived information in a language selected by the user or suggested by the viewed content. Supplemental content comprising lists of cardinal calendar dates, historical notes, voice recordings, video recordings, music, and other content, indexed to the timeline or not, can be accessed from linked files. As one example, a mouse click on an icon can cause the name of and selected information about the represented individual to be read aloud to the user together with the names of other people also living at that time and mention of historical events which occurred in that time frame. As another example, a mouse rollover of the year 1789 on the vertical timeline could trigger an audio file discussing the French revolution or initiate the playing of The Marseillaise. As another example, recorded speeches of Winston Churchill might be heard by the user viewing the World War II years.

The present method also provides for interaction between the user and an icon or other displayed element in which the icon or other element appears to speak to or converse with the user by interpreting the user's speech or other input through artificial intelligence or some other means.

The present method also provides for importing data from other genealogy programs or elsewhere, for accepting data directly entered into the application, for exporting data, for printing perspective views of all or portions of the display array on paper or other surface, and for three-dimensional printing of all or portions of the display array or a representation thereof.

The present method also provides for displaying the family relationships of dogs, horses, and other pedigreed or non-pedigreed animals, such as a managed species in which only a few individuals may be in existence and whose breeding is tightly controlled to avoid genetic weaknesses from endangering the survival of the species. Families of plants and fungi and other organisms may also be displayed using the present method.

The following Embodiments I and II provide examples of algorithms for X, Y and Z coordinate assignments. X and Y offset coordinate values are assigned to individuals in selected Display Array relative to a selected Home Person, based on the genealogical relationship of the Home Person to the other individuals. This selection is performed automatically by a software algorithm when a particular Home Person and a particular display algorithm or Scene (e.g., an algorithm for displaying lineal relatives, collateral relatives, both lineal and collateral relatives, or a subset of the foregoing) is selected by a user. Embodiments I and II, below illustrate how the X, Y and Z coordinates can be defined for two different Display Array scenarios.

In the methods described herein, any individual within a genealogical data set can be selected as Home Person by a user, by a default software setting, of preferably by both. Once a Display Array of icons representing the selected individuals has been established on a display screen, a virtual avatar of the user, represented by a screen pointer or icon, can dynamically move through the Display Array under the control of the user. The virtual three-dimensional location of the icon or pointer representing the avatar on the display screen dictates the viewing perspective of the user. The virtual position of the avatar is controlled by an input device such as a joystick, a mouse, keyboard inputs, or any combination thereof.

A preferred method of managing the data in the computer system used in displaying three-dimensional genealogical information is to use Source Data to create an Input File and then apply user-specified parameters to the Input File to create one or more Display Files. Data in a selected Display File is then used to create the three-dimensional Display Array.

Input Software will use the Source Data to create the Input File. Display Software will then build the various Display Files using the Input File. Array Software such as Unity3D or custom video software will then create the three-dimensional array associated with each Display File.

Source Data comprises all of the available genealogy information pertaining to a particular family group such as that which would be included in a typical two-dimensional ancestry chart. This will typically include the name, sex, birth date, death date (if any), and spousal and familial information for each person. Often also included are the names of birthplaces and places of death, marriage dates and locations, historical and reference notes, image files, and sometimes audio or video files.

A preferred source of Source Data is a genealogical file in the FamilySearch® GEDCOM format, which is a de facto standard open file format specification for storing genealogical data and exchanging data with compatible genealogy software.

A preferred embodiment of the Input Software will deduce, interpolate, extrapolate, or estimate appropriate birth and death dates that are missing from the Source Data and add those dates to the Input File.

Another preferred embodiment of the Input Software is to optionally create one or more Auxiliary Input Files if the Source Data includes a quantity of image, video, audio, or other non-text files that would make one Input File so large as to be unwieldy.

Family trees comprising 5,000 or 10,000 or more individuals are common, and computational geneticist Yaniv Erlich of Columbia University is reported to have published a tree comprising some 13 million consanguineal and affinal kin (Kaplanis, J. et al., Science 1 Mar. 2018 Vol 360 Issue 6385, 171-175). Kaplanis et al. also reported that they developed a simple procedure to overlay other data sets with their resource. If the Source Data at hand contains a very large number of individuals, it may be desirable to limit any particular display to a subset of those individuals.

Embodiment I. A Rectangular Sector Array Displaying all Lineal and Collateral Consanguineal Relatives In this embodiment, all of the people sharing one or more common ancestors with the Home Person are displayed. Optionally and preferably, the affinial spouses of the consanguineal relatives may also be displayed. Optionally, adoptive relationships may be treated as consanguineal for display purposes.

Consanguineal displays include children, siblings, parents, and grandparents, aunts, uncles, nieces, nephews, and cousins of all degrees and generation differences. The choice of the Home Person dictates whether any other given individual in the genealogical tree will appear in the display as a child, a sibling, a parent, or a grandparent, aunt or uncle, niece or nephew, or cousin of any degree, or whether that individual will appear at all since he or she may not be a consanguine of a particular Home Person.

A. Location Sector Definitions and Assignment of X and Y Offset Coordinates In order to accommodate all of the possible selections of Home Person, this embodiment employs sectors which are each four units wide on the X Axis (the left/right axis) and as long on the Y Axis (the forward/backward axis) as necessary to accommodate all of the family members in the sector. There are four off-set X coordinates per sector in order to allow for the fact that there is a great deal of overlap in the lifetimes of four generations of people and individuals in all four generations may be alive at the same time. Using a standard separation of 30 years between generations, four units along the X Axis allows 120 years of vertical separation at every X coordinate.

Figure 5:
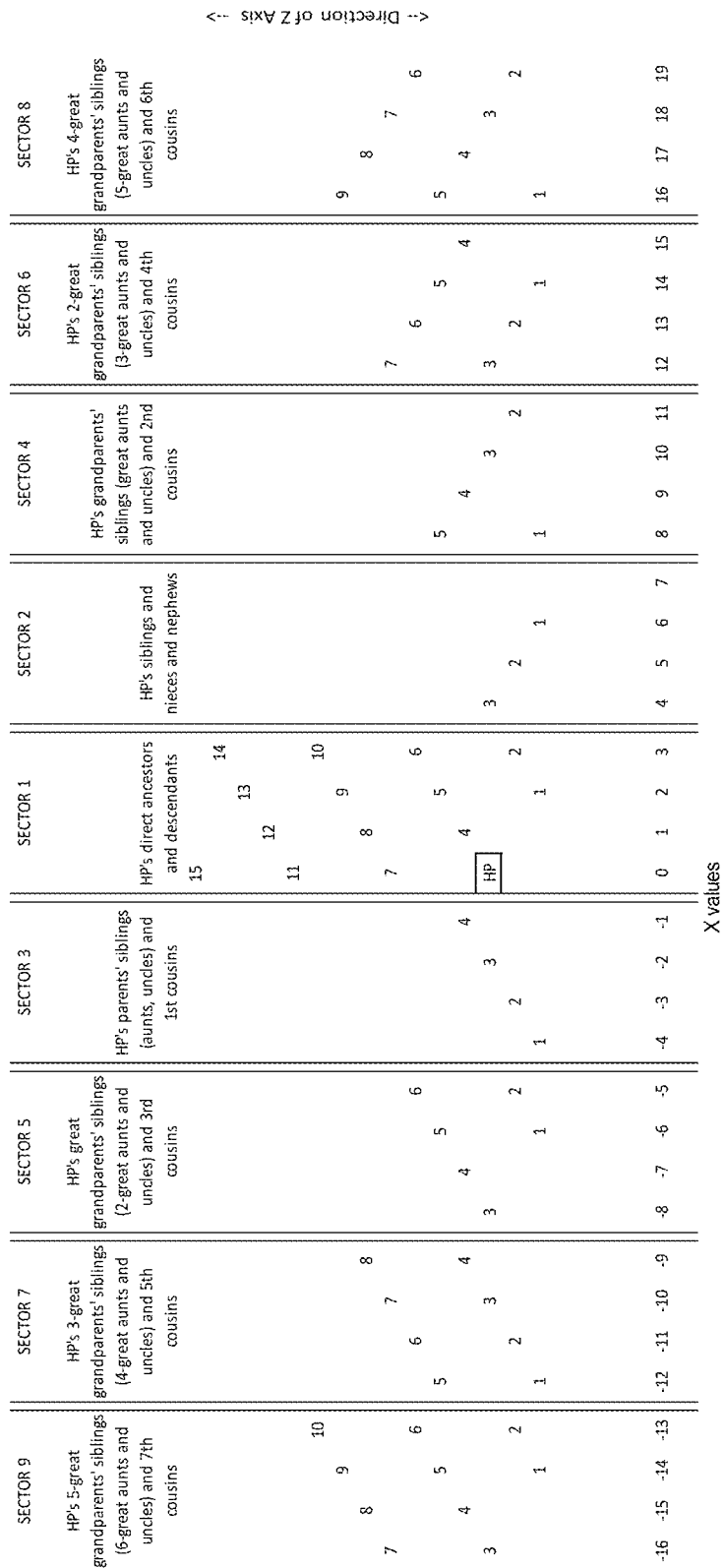
FIG. 5 provides an exploded elevation view of a location sector assignment scheme for a rectangular sector array displaying all lineal and collateral consanguineal relatives of a Home Person which illustrates the way in which X value coordinates can be assigned by generation relative to X=0 for the Home Person; in this scheme the Home Person (HP) is a member of the third generation of his or her immediate family; numbers within the sectors represent generations of the individuals, and the numbers (positive and negative) below the sectors represent X-axis values relative to 0 for the Home Person. In the exploded view the data points are shown at differing heights even though there is no vertical component to the data.
Figure 6:
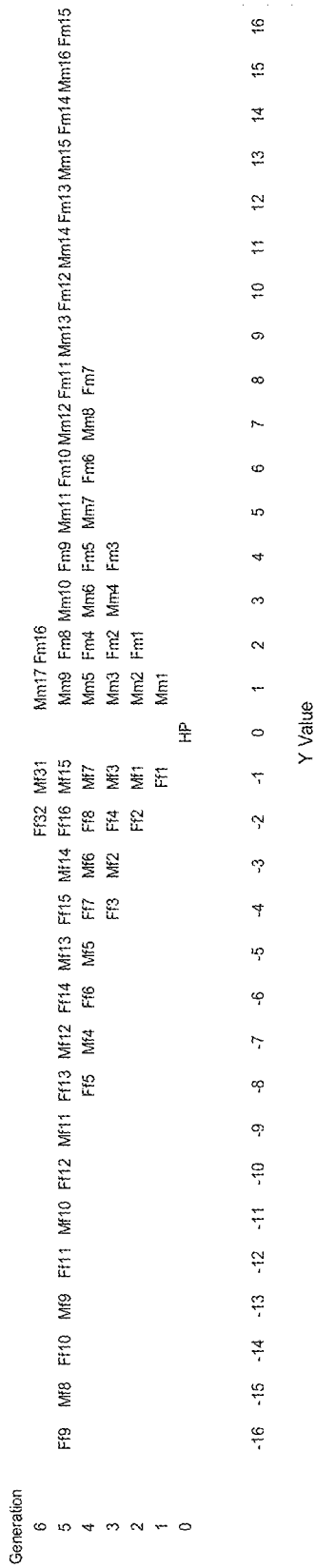
FIG. 6 illustrates a exploded elevation view of Y value assignments for Sector 1 in the above rectangular sector array displaying all lineal and collateral consanguineal relatives of the Home Person relative to Y=0 for the Home Person. In the exploded view the data points are shown at differing heights even though there is no vertical component to the data.

FIG. 5 illustrates the location sector assignment scheme used in the description of this Embodiment I for assigning X offset coordinate values for individuals in a Display Array relative to a Home Person based on location sectors for different classifications of relatives of the Home Person. FIG. 6 illustrates the Y-offset value assignment scheme used in this Embodiment I. In FIG. 5, the Home Person (HP) is a member of the third generation of his or her immediate family. Note that the vertical positions of the generation numbers in FIG. 5 and the vertical positions of the ancestors in FIG. 6 are only illustrative and that no Z-Axis coordinates are specified in the two drawings. In FIG. 5, numbers within the sectors represent generations of the individuals, and the numbers (positive and negative) below the sectors represent X-axis offsets relative to 0 for the Home Person.

The location sectors are defined as follows:

Sector 1 is reserved for all lineal relatives of the Home Person, i.e., those people in a direct line of descent, including grandparents of any degree, parents, children, and grandchildren of any degree.

Sector 2 is reserved for the siblings of the Home Person and their descendants. The descendants of the siblings will be nieces and nephews of any and all degree (i.e., great-grand-niece) of the Home Person.

Sector 3 is reserved for the siblings of the parents of the Home Person and their descendants. These siblings will be aunts and uncles of the Home person and the descendants will be first cousins of any and all generation levels (i.e., first cousin twice removed) of the Home Person.

Sector 4 is reserved for the siblings of the grandparents of the Home Person and their descendants. These siblings will be great aunts and great uncles of the Home Person and the descendants will be second cousins of any and all generation levels (i.e., second cousin three times removed) of the Home Person.

Sector 5 is reserved for the siblings of the great-grandparents of the Home Person and their descendants. These siblings will be great-great aunts and great-great uncles of the Home Person and the descendants will be third cousins of any and all generation levels (i.e., third cousin once removed) of the Home Person.

Sector 6 is reserved for the siblings of the great-great-grandparents of the Home Person and their descendants. These siblings will be great-great-great aunts and great-great-great uncles of the Home Person and the descendants will be fourth cousins of any and all generation levels (i.e., fourth cousin five times removed) of the Home Person.

Sector 7 is reserved for the siblings of the great-great-great-grandparents of the Home Person and their descendants. These siblings will be 4-great aunts and 4-great uncles of the Home Person and the descendants will be fifth cousins of any and all generation levels (i.e., fifth cousin twice removed) of the Home Person.

Sector 8 is reserved for the siblings of the 4-great-grandparents of the Home Person and their descendants. These siblings will be 5-great aunts and 5-great uncles of the Home Person and the descendants will be sixth cousins of any and all generation levels (i.e., sixth cousin four times removed) of the Home Person.

Sector 9 is reserved for the siblings of the 5-great-grandparents of the Home Person and their descendants. These siblings will be 6-great aunts and 6-great uncles of the Home Person and the descendants will be seventh cousins of any and all generation levels (i.e., seventh cousin twice removed) of the Home Person.

Sectors 10, 11, 12, and so on are reserved as needed for additional relatives using this same assignment scheme.

Step 1: X-Axis Offset Value Assignments

If the user elects to display the affinial spouses of the consanguineal family members, the spouses should be assigned the same X-Axis offset value as the corresponding consanguineal family member.

1a. Sector 1 Linear Descendants:

Select a Home Person and assign (X)=(0) to the Home Person (the HP).

Assign (X)=(3) to the children of the Home Person.

Assign (X)=(2) to the grandchildren of the Home Person.

Assign (X)=(1) to the great-grandchildren of the Home Person.

Assign (X)=(0) to the 2-great-grandchildren of the Home Person.
Assign (X)=(3) to the 2-great-grandchildren of the Home Person.
Continue as needed with any other descendants of the Home Person.

1b. Sector 1 Linear Ancestors:
Assign (X)=(1) to the parents of the Home Person.
Assign (X)=(2) to the grandparents of the Home Person.
Assign (X)=(3) to the great-grandparents of the Home Person.
Assign (X)=(0) to the 2-great-grandparents of the Home Person.
Assign (X)=(1) to the 3-great-grandparents of the Home Person.
Assign (X)=(2) to the 4-great-grandparents of the Home Person.
Assign (X)=(3) to the 5-great-grandparents of the Home Person.
Assign (X)=(0) to the 6-great-grandparents of the Home Person.
Continue as needed with any other direct ancestors.

1c. Sector 2 Collateral Relatives:
Assign (X)=(4) to the siblings of the Home Person.
Assign (X)=(5) to the children of the siblings of the Home Person.
Assign (X)=(6) to the grandchildren children of the siblings of the Home Person.
Assign (X)=(7) to the great-grandchildren of the siblings of the Home Person.
Assign (X)=(4) to the 2-great-grandchildren of the siblings of the Home Person.
Continue as needed with any other descendants of the siblings of the Home Person.

1d. Sector 3 Collateral Relatives:
Assign (X)=(−1) to the siblings of the parents of the Home Person.
Assign (X)=(−2) to the children of the siblings of the parents of the Home Person.
Assign (X)=(−3) to the grandchildren children of the siblings of the parents of the Home Person.
Assign (X)=(−4) to the great-grandchildren children of the siblings of the parents of the Home Person.
Assign (X)=(−1) to the 2-great-grandchildren children of the siblings of the parents of the Home Person.
Continue as needed with any other descendants of the siblings of the parents of the Home Person.

1e. Sector 4 Collateral Relatives:
Assign (X)=(8) to the siblings of the grandparents of the Home Person.
Assign (X)=(9) to the children of the siblings of the grandparents of the Home Person.
Assign (X)=(10) to the grandchildren of the siblings of the grandparents of the Home Person.
Assign (X)=(11) to the great-grandchildren of the siblings of the grandparents of the Home Person.
Assign (X)=(8) to the 2nd-great-grandchildren of the siblings of the grandparents of the Home Person.
Continue as needed with any other descendants of the siblings of the grandparents of the Home Person.

1f. Sector 5 Collateral Relatives:
Assign (X)=(−5) to the siblings of the great-grandparents of the Home Person.
Assign (X)=(−6) to the children of the siblings of the great-grandparents of the Home Person.
Assign (X)=(−7) to the grandchildren of the siblings of the great-grandparents of the Home Person.
Assign (X)=(−8) to the great-grandchildren of the siblings of the great-grandparents of the Home Person.
Assign (X)=(−5) to the grandchildren of the siblings of the great-grandparents of the Home Person.
Continue as needed with any other descendants of the siblings of the great-grandparents of the Home Person.

1g. Sector 6 Collateral Relatives:
Assign (X)=(12) to the siblings of the 2-great-grandparents of the Home Person.
Assign (X)=(13) to the children of the siblings of the 2-great-grandparents of the Home Person.
Assign (X)=(14) to the grandchildren of the siblings of the 2-great-grandparents of the Home Person.
Assign (X)=(15) to the great-grandchildren of the siblings of the 2-great-grandparents of the Home Person.
Assign (X)=(12) to the 2-great-grandchildren of the siblings of the 2-great-grandparents of the Home Person.
Continue as needed with any other descendants of the siblings of the 2-great-grandparents of the Home Person.

1h. Sector 7 Collateral Relatives:
Assign (X)=(−9) to the siblings of the 3-great-grandparents of the Home Person.
Assign (X)=(−10) to the children of the siblings of the 3-great-grandparents of the Home Person.
Assign (X)=(−11) to the grandchildren of the siblings of the 3-great-grandparents of the Home Person.
Assign (X)=(−12) to the great-grandchildren of the siblings of the 3-great-grandparents of the Home Person
Assign (X)=(−9) to the 2-great-grandchildren of the siblings of the 3-great-grandparents of the Home Person.
Continue as needed with any other descendants of the siblings of the 3-great-grandparents of the Home Person.

1i. Sector 8 Collateral Relatives:
Assign (X)=(16) to the siblings of the 4-great-grandparents of the Home Person.
Assign (X)=(17) to the children of the siblings of the 4-great-grandparents of the Home Person.
Assign (X)=(18) to the grandchildren of the siblings of the 4-great-grandparents of the Home Person.
Assign (X)=(19) to the great-grandchildren of the siblings of the 4-great-grandparents of the Home Person.
Assign (X)=(16) to the 2-great-grandchildren of the siblings of the 4-great-grandparents of the Home Person.
Continue as needed with any other descendants of the siblings of the 4-great-grandparents of the Home Person.

1j. Sector 9 Collateral Relatives:
Assign (X)=(−13) to the siblings of the 5-great-grandparents of the Home Person.
Assign (X)=(−14) to the children of the siblings of the 5-great-grandparents of the Home Person.
Assign (X)=(−15) to the grandchildren of the siblings of the 5-great-grandparents of the Home Person.
Assign (X)=(−16) to the great-grandchildren of the siblings of the 5-great-grandparents of the Home Person.
Assign (X)=(−13) to the 2-great-grandchildren of the siblings of the 5-great-grandparents of the Home Person.
Continue as needed with any other descendants of the siblings of the 5-great-grandparents of the Home Person.

1k. Sector 10, Sector 11, Sector 12, and Other Collateral Relatives:
Continue as needed with siblings of the 6-great-, 7-great-, 8-great-, and other grandparents of the Home Person until all collateral relatives of the Home Person have been given X-Axis assignments.

Step 2: Y-Axis Offset Value Assignments

FIG. 6 illustrates Y-offset value assignments for Sector 1 lineal ancestors in a rectangular sector array displaying all lineal and collateral consanguineal relatives of the Home Person relative to Y=0 for the Home Person. If the user has elected to display the affinial spouses of the consanguineal family members, the spouses are assigned one Y-Axis value less than the value assigned to the corresponding consanguineal family member. In FIG. 6, the Y-values were assigned as follows:

2a. Sector 1 Lineal Descendants:

Count the number of individuals assigned to (X)=(3); this number is n:

If n=1, assign (Y)=(0) to this person.

If n>1, determine a linear order for the consanguineal family members based on their dates of birth with the senior person having the earliest date of birth.

Adjust this linear order by incorporating ahead of each corresponding consanguineal family member any affinial spouses:

If n>1 and n is an even number, compute y=n/2.

If n>1 and n is an odd number, compute y=(n−1)/2.

Assign (Y)=(−y) to the senior person or the affinial spouse of the senior person.

Assign (Y)=(−y+1) to the second person in the linear order, assign (Y)=(−y+2) to the third person in the order, assign (Y)=(−y+3) to the fourth person, and continue such assignments until all individuals assigned to (X)=(3) have received a Y-Axis assignment.

Count the number of individuals assigned to (X)=(2); this number is n.

If n=1, assign (Y)=(0) to this person.

If n>1, determine a linear order for the consanguineal family members based first on the linear order of their parent or parents in (X)=(3) and second on their dates of birth, with the senior person having the parent with lowest Y-Value assignment in (X)=(3).

Adjust this linear order by incorporating ahead of each corresponding consanguineal family member any affinial spouses:

If n>1 and n is an even number, compute y=n/2.

If n>1 and n is an odd number, compute y=(n−1)/2.

Assign (Y)=(−y) to the senior person or the affinial spouse of the senior person.

Assign (Y)=(−y+1) to the second person in the linear order, assign (Y)=(−y+2) to the third person in the order, assign (Y)=(−y+3) to the fourth person, and continue such assignments until all individuals assigned to (X)=(2) have received a Y-Axis assignment Count the number of individuals assigned to (X)=(1); this number is n:

If n=1, assign (Y)=(0) to this person.

If n>1, determine a linear order for the consanguineal family members based first on the linear order of their parent or parents in (X)=(2) and second on their dates of birth, with the senior person having the parent with lowest Y-Value assignment in (X)=(2).

Adjust this linear order by incorporating ahead of each corresponding consanguineal family member any affinial spouses:

If n>1 and n is an even number, compute y=n/2.

If n>1 and n is an odd number, compute y=(n−1)/2.

Assign (Y)=(−y) to the senior person or the affinial spouse of the senior person.

Assign (Y)=(−y+1) to the second person in the linear order, assign (Y)=(−y+2) to the third person in the order, assign (Y)=(−y+3) to the fourth person, and continue such assignments until all individuals assigned to (X)=(1) have received a Y-Axis assignment Count the number of individuals assigned to (X)=(0); this number is n:

If n=1, assign (Y)=(0) to this person.

If n>1, determine a linear order for the consanguineal family members based first on the linear order of their parent or parents in (X)=(1) and second on their dates of birth, with the senior person having the parent with lowest Y-Value assignment in (X)=(1).

Adjust this linear order by incorporating ahead of each corresponding consanguineal family member any affinial spouses:

If n>1 and n is an even number, compute y=n/2.

If n>1 and n is an odd number, compute y=(n−1)/2.

Assign (Y)=(−y) to the senior person or the affinial spouse of the senior person.

Assign (Y)=(−y+1) to the second person in the linear order, assign (Y)=(−y+2) to the third person in the order, assign (Y)=(−y+3) to the fourth person, and continue such assignments until all individuals assigned to (X)=(0) have received a Y-Axis assignment Count the number of individuals assigned to (X)=(3); this number is n:

Continue using this method for (X)=(3), (X)=(2), (X)=(1), (X)=(0) and so on as needed until all lineal descendants of the Home Person have been given Y-Axis assignments.

2b. Sector 1 Lineal Ancestors:

Everyone has the same number of direct ancestors even though the names and other biographical information of these consanguineal family members may not be known. Because of this the user might elect to employ placeholder icons in the ancestor portion of Sector 1. See the information about placeholder icons in the Embodiment II discussion below.

Parents in (X)=(1):

Assign (Y)=(−1) to the father and (Y)=(1) to the mother of the Home Person (these parents are Ff1 and Mm1).

Grandparents in (X)=(2):

Assign (Y)=(−2) to the father and (Y)=(−1) to the mother of the father of the Home Person (this father is Ff2).

Assign (Y)=(1) to the mother and (Y)=(2) to the father of the mother of the Home Person (this mother is Mm2).

Great-Grandparents in (X)=(3):

Assign (Y)=(−4) to the father and (Y)=(−3) to the mother of Ff2 (this father is Ff3).

Assign (Y)=(−2) to the father and (Y)=(−1) to the mother of the wife of Ff2 (this father is Ff4).

Assign (Y)=(1) to the mother and (Y)=(2) to the father of Mm2 (this mother is Mm3).

Assign (Y)=(3) to the mother and (Y)=(4) to the father of the husband of Mm2 (this mother is Mm4).

2nd-Great-Grandparents in (X)=(0):

Assign (Y)=(−8) to the father and (Y)=(−7) to the mother of Ff3 (this father is Ff5).

Assign (Y)=(−6) to the father and (Y)=(−5) to the mother of the wife of Ff3 (this father is Ff6).

Assign (Y)=(−4) to the father and (Y)=(−3) to the mother of Ff4 (this father is Ff7).

Assign (Y)=(−2) to the father and (Y)=(−1) to the mother of the wife of Ff4 (this father is Ff8).

Assign (Y)=(1) to the mother and (Y)=(2) to the father of Mm3 (this mother is Mm5).

Assign (Y)=(3) to the mother and (Y)=(4) to the father of the husband of Mm3 (this mother is Mm6).
Assign (Y)=(5) to the mother and (Y)=(6) to the father of Mm4 (this mother is Mm7).
Assign (Y)=(7) to the mother and (Y)=(8) to the father of the husband of Mm4 (this mother is Mm8).
3rd-Great-Grandparents in (X)=(1):
Assign (Y)=(−16) to the father and (Y)=(−15) to the mother of Ff5 (this father is Ff9).
Assign (Y)=(−14) to the father and (Y)=(−13) to the mother of the wife of Ff5 (this father is Ff10).
Assign (Y)=(−12) to the father and (Y)=(−11) to the mother of Ff6 (this father is Ff11).
Assign (Y)=(−10) to the father and (Y)=(−9) to the mother of the wife of Ff6 (this father is Ff12).
Assign (Y)=(−8) to the father and (Y)=(−7) to the mother of Ff7 (this father is Ff13).
Assign (Y)=(−6) to the father and (Y)=(−5) to the mother of the wife of Ff7 (this father is Ff14).
Assign (Y)=(−4) to the father and (Y)=(−3) to the mother of Ff8 (this father is Ff15).
Assign (Y)=(−2) to the father and (Y)=(−1) to the mother of the wife of Ff8 (this father is Ff16).
Assign (Y)=(1) to the mother and (Y)=(2) to the father of Mm5 (this mother is Mm9).
Assign (Y)=(3) to the mother and (Y)=(4) to the father of the husband of Mm5 (this mother is Mm10).
Assign (Y)=(5) to the mother and (Y)=(6) to the father of Mm6 (this mother is Mm11).
Assign (Y)=(7) to the mother and (Y)=(8) to the father of the husband of Mm6 (this mother is Mm12).
Assign (Y)=(9) to the mother and (Y)=(10) to the father of Mm7 (this mother is Mm13).
Assign (Y)=(11) to the mother and (Y)=(12) to the father of the husband of Mm7 (this mother is Mm14).
Assign (Y)=(13) to the mother and (Y)=(14) to the father of Mm8 (this mother is Mm15).
Assign (Y)=(15) to the mother and (Y)=(16) to the father of the husband of Mm8 (this mother is Mm16).
4th-Great-Grandparents in (X)=(2):
Continue making assignments using this method as needed in (X)=(2), (X)=(3), (X)+(0), and so on, respectively, for the 4-great-, 5-great-, 6-great-grandparents, and others until all of the lineal ancestors of the Home Person have been given Y-Axis assignments.

2c. Sector 2, Home Person's Siblings, Nieces and Nephews:
Count the number of individuals assigned to (X)=(4); this number is n:
If n=1, assign (Y)=(0) to this person.
If n>1, determine a linear order for the consanguineal family members based on their dates of birth with the senior person having the earliest date of birth.
Adjust this linear order by incorporating ahead of each corresponding consanguineal family member any affinial spouses:
If n>1 and n is an even number, compute y=n/2.
If n>1 and n is an odd number, compute y=(n−1)/2.
Assign (Y)=(−y) to the senior person or the affinial spouse of the senior person.
Assign (Y)=(−y+1) to the second person in the linear order, assign (Y)=(−y+2) to the third person in the order, assign (Y)=(−y+3) to the fourth person, and continue such assignments until all individuals assigned to (X)=(4) have received a Y-Axis assignment.

Count the number of individuals assigned to (X)=(5); this number is n:
If n=1, assign (Y)=(0) to this person.
If n>1, determine a linear order for the consanguineal family members based first on the linear order of their parent or parents in (X)=(4) and second on their dates of birth, with the senior person having the parent with lowest Y-Value assignment in (X)=(4).
Adjust this linear order by incorporating ahead of each corresponding consanguineal family member any affinial spouses:
If n>1 and n is an even number, compute y=n/2.
If n>1 and n is an odd number, compute y=(n−1)/2.
Assign (Y)=(−y) to the senior person or the affinial spouse of the senior person.
Assign (Y)=(−y+1) to the second person in the linear order, assign (Y)=(−y+2) to the third person in the order, assign (Y)=(−y+3) to the fourth person, and continue such assignments until all individuals assigned to (X)=(5) have received a Y-Axis assignment.

Count the number of individuals assigned to (X)=(6); this number is n:
If n=1, assign (Y)=(0) to this person.
If n>1, determine a linear order for the consanguineal family members based first on the linear order of their parent or parents in (X)=(5) and second on their dates of birth, with the senior person having the parent with lowest Y-Value assignment in (X)=(5).
Adjust this linear order by incorporating ahead of each corresponding consanguineal family member any affinial spouses:
If n>1 and n is an even number, compute y=n/2.
If n>1 and n is an odd number, compute y=(n−1)/2.
Assign (Y)=(−y) to the senior person or the affinial spouse of the senior person.
Assign (Y)=(−y+1) to the second person in the linear order, assign (Y)=(−y+2) to the third person in the order, assign (Y)=(−y+3) to the fourth person, and continue such assignments until all individuals assigned to (X)=(6) have received a Y-Axis assignment.

Count the number of individuals assigned to (X)=(7); this number is n:
If n=1, assign (Y)=(0) to this person.
If n>1, determine a linear order for the consanguineal family members based first on the linear order of their parent or parents in (X)=(6) and second on their dates of birth, with the senior person having the parent with lowest Y-Value assignment in (X)=(6).
Adjust this linear order by incorporating ahead of each corresponding consanguineal family member any affinial spouses:
If n>1 and n is an even number, compute y=n/2.
If n>1 and n is an odd number, compute y=(n−1)/2.
Assign (Y)=(−y) to the senior person or the affinial spouse of the senior person.
Assign (Y)=(−y+1) to the second person in the linear order, assign (Y)=(−)+2) to the third person in the order, assign (Y)=(−y+3) to the fourth person, and continue such assignments until all individuals assigned to (X)=(7) have received a Y-Axis assignment.

Count the number of individuals assigned to (X)=(4); this number is n:
If n=1, assign (Y)=(0) to this person.
If n>1, determine a linear order for the consanguineal family members based first on the linear order of their parent or parents in (X)=(7) and second on their dates of birth, with the senior person having the parent with lowest Y-Value assignment in (X)=(7).

Adjust this linear order by incorporating ahead of each corresponding consanguineal family member any affinial spouses:

If n>1 and n is an even number, compute y=n/2.

If n>1 and n is an odd number, compute y=(n−1)/2.

Assign (Y)=(−y) to the senior person or the affinial spouse of the senior person.

Assign (Y)=(−y+1) to the second person in the linear order, assign (Y)=(−y+2) to the third person in the order, assign (Y)=(−y+3) to the fourth person, and continue such assignments until all individuals assigned to (X)=(4) have received a Y-Axis assignment.

Count the number of individuals assigned to (X)=(5); this number is n:

Continue using this method for (X)=(5), (X)=(6), (X)=(7), (X)=(4), and so on as needed until all the descendants of the Home Person's siblings have been given Y-Axis assignments.

2d. Sector 3, Home Person's Parents' Siblings:

Count the number of individuals assigned to (X)=(−1); this number is n:

If n=1, assign (Y)=(0) to this person.

If n>1, determine a linear order for the consanguineal family members based on their dates of birth with the senior person having the earliest date of birth.

Adjust this linear order by incorporating ahead of each corresponding consanguineal family member any affinial spouses:

If n>1 and n is an even number, compute y=n/2.

If n>1 and n is an odd number, compute y=(n−1)/2.

Assign (Y)=(−y) to the senior person or the affinial spouse of the senior person.

Assign (Y)=(−y+1) to the second person in the linear order, assign (Y)=(−y+2) to the third person in the order, assign (Y)=(−y+3) to the fourth person, and continue such assignments until all individuals assigned to (X)=(−1) have received a Y-Axis assignment.

Count the number of individuals assigned to (X)=(−2); this number is n:

If n=1, assign (Y)=(0) to this person.

If n>1, determine a linear order for the consanguineal family members based first on the linear order of their parent or parents in (X)=(−1) and second on their dates of birth, with the senior person having the parent with lowest Y-Value assignment in (X)=(−1).

Adjust this linear order by incorporating ahead of each corresponding consanguineal family member any affinial spouses:

If n>1 and n is an even number, compute y=n/2.

If n>1 and n is an odd number, compute y=(n−1)/2.

Assign (Y)=(−y) to the senior person or the affinial spouse of the senior person.

Assign (Y)=(−y+1) to the second person in the linear order, assign (Y)=(−y+2) to the third person in the order, assign (Y)=(−y+3) to the fourth person, and continue such assignments until all individuals assigned to (X)=(−2) have received a Y-Axis assignment.

Count the number of individuals assigned to (X)=(−3); this number is n:

If n=1, assign (Y)=(0) to this person.

If n>1, determine a linear order for the consanguineal family members based first on the linear order of their parent or parents in (X)=(−2) and second on their dates of birth, with the senior person having the parent with lowest Y-Value assignment in (X)=(−2).

Adjust this linear order by incorporating ahead of each corresponding consanguineal family member any affinial spouses: If n>1 and n is an even number, compute y=n/2.

If n>1 and n is an odd number, compute y=(n−1)/2.

Assign (Y)=(−y) to the senior person or the affinial spouse of the senior person.

Assign (Y)=(−y+1) to the second person in the linear order, assign (Y)=(−y+2) to the third person in the order, assign (Y)=(−y+3) to the fourth person, and continue such assignments until all individuals assigned to (X)=(−3) have received a Y-Axis assignment.

Count the number of individuals assigned to (X)=(−4); this number is n:

If n=1, assign (Y)=(0) to this person

If n>1, determine a linear order for the consanguineal family members based first on the linear order of their parent or parents in (X)=(−3) and second on their dates of birth, with the senior person having the parent with lowest Y-Value assignment in (X)=(−3).

Adjust this linear order by incorporating ahead of each corresponding consanguineal family member any affinial spouses:

If n>1 and n is an even number, compute y=n/2.

If n>1 and n is an odd number, compute y=(n−1)/2.

Assign (Y)=(−y) to the senior person or the affinial spouse of the senior person.

Assign (Y)=(−y+1) to the second person in the linear order, assign (Y)=(−y+2) to the third person in the order, assign (Y)=(−y+3) to the fourth person, and continue such assignments until all individuals assigned to (X)=(−4) have received a Y-Axis assignment.

Count the number of individuals assigned to (X)=(−1); this number is n:

If n=1, assign (Y)=(0) to this person.

If n>1, determine a linear order for the consanguineal family members based first on the linear order of their parent or parents in (X)=(−4) and second on their dates of birth, with the senior person having the parent with lowest Y-Value assignment in (X)=(−4).

Adjust this linear order by incorporating ahead of each corresponding consanguineal family member any affinial spouses:

If n>1 and n is an even number, compute y=n/2.

If n>1 and n is an odd number, compute y=(n−1)/2.

Assign (Y)=(−y) to the senior person or the affinial spouse of the senior person.

Assign (Y)=(−y+1) to the second person in the linear order, assign (Y)=(−y+2) to the third person in the order, assign (Y)=(−y+3) to the fourth person, and continue such assignments until all individuals assigned to (X)=(−1) have received a Y-Axis assignment.

Count the number of individuals assigned to (X)=(−2); this number is n:

Continue using this method for (X)=(−2), (X)=(−3), (X)=(−4), (X)=(−1), and so on as needed until all the descendants of the Home Person parents' siblings have been given Y-Axis assignments.

2e. Sector 4, Home Person's Grandparents' Siblings:
Count the number of individuals assigned to (X)=(8); this number is n:
- If n=1, assign (Y)=(0) to this person.
- If n>1, determine a linear order for the consanguineal family members based on their dates of birth with the senior person having the earliest date of birth.
- Adjust this linear order by incorporating ahead of each corresponding consanguineal family member any affinial spouses:
- If n>1 and n is an even number, compute y=n/2.
- If n>1 and n is an odd number, compute y=(n−1)/2.
- Assign (Y)=(−y) to the senior person or the affinial spouse of the senior person.
- Assign (Y)=(−y+1) to the second person in the linear order, assign (Y)=(−y+2) to the third person in the order, assign (Y)=(−y+3) to the fourth person, and continue such assignments until all individuals assigned to (X)=(8) have received a Y-Axis assignment.

Count the number of individuals assigned to (X)=(9); this number is n:
- If n=1, assign (Y)=(0) to this person.
- If n>1, determine a linear order for the consanguineal family members based first on the linear order of their parent or parents in (X)=(8) and second on their dates of birth, with the senior person having the parent with lowest Y-Value assignment in (X)=(8).
- Adjust this linear order by incorporating ahead of each corresponding consanguineal family member any affinial spouses:
- If n>1 and n is an even number, compute y=n/2.
- If n>1 and n is an odd number, compute y=(n−1)/2.
- Assign (Y)=(−y) to the senior person or the affinial spouse of the senior person.
- Assign (Y)=(−y+1) to the second person in the linear order, assign (Y)=(−y+2) to the third person in the order, assign (Y)=(−y+3) to the fourth person, and continue such assignments until all individuals assigned to (X)=(9) have received a Y-Axis assignment.

Count the number of individuals assigned to (X)=(10); this number is n:
- If n=1, assign (Y)=(0) to this person.
- If n>1, determine a linear order for the consanguineal family members based first on the linear order of their parent or parents in (X)=(9) and second on their dates of birth, with the senior person having the parent with lowest Y-Value assignment in (X)=(9).
- Adjust this linear order by incorporating ahead of each corresponding consanguineal family member any affinial spouses:
- If n>1 and n is an even number, compute y=n/2.
- If n>1 and n is an odd number, compute y=(n−1)/2.
- Assign (Y)=(−y) to the senior person or the affinial spouse of the senior person.
- Assign (Y)=(−y+1) to the second person in the linear order, assign (Y)=(−y+2) to the third person in the order, assign (Y)=(−y+3) to the fourth person, and continue such assignments until all individuals assigned to (X)=(10) have received a Y-Axis assignment.

Count the number of individuals assigned to (X)=(11); this number is n:
- If n=1, assign (Y)=(0) to this person.
- If n>1, determine a linear order for the consanguineal family members based first on the linear order of their parent or parents in (X)=(10) and second on their dates of birth, with the senior person having the parent with lowest Y-Value assignment in (X)=(10).
- Adjust this linear order by incorporating ahead of each corresponding consanguineal family member any affinial spouses:
- If n>1 and n is an even number, compute y=n/2.
- If n>1 and n is an odd number, compute y=(n−1)/2.
- Assign (Y)=(−y) to the senior person or the affinial spouse of the senior person.
- Assign (Y)=(−y+1) to the second person in the linear order, assign (Y)=(−y+2) to the third person in the order, assign (Y)=(−y+3) to the fourth person, and continue such assignments until all individuals assigned to (X)=(11) have received a Y-Axis assignment.

Count the number of individuals assigned to (X)=(8); this number is n:
- If n=1, assign (Y)=(0) to this person.
- If n>1, determine a linear order for the consanguineal family members based first on the linear order of their parent or parents in (X)=(11) and second on their dates of birth, with the senior person having the parent with lowest Y-Value assignment in (X)=(11).
- Adjust this linear order by incorporating ahead of each corresponding consanguineal family member any affinial spouses:
- If n>1 and n is an even number, compute y=n/2.
- If n>1 and n is an odd number, compute y=(n−1)/2.
- Assign (Y)=(−y) to the senior person or the affinial spouse of the senior person.
- Assign (Y)=(−y+1) to the second person in the linear order, assign (Y)=(−y+2) to the third person in the order, assign (Y)=(−y+3) to the fourth person, and continue such assignments until all individuals assigned to (X)=(8) have received a Y-Axis assignment.

Count the number of individuals assigned to (X)=(9); this number is n:
- Continue using this method for (X)=(9), (X)=(10), (X)=(11), (X)=(8), and so on as needed until all the descendants of the Home Person grandparents' siblings have been given Y-Axis assignments.

2f. Sector 5, Home Person's Great-Grandparents' Siblings:
Count the number of individuals assigned to (X)=(−5); this number is n:
- If n=1, assign (Y)=(0) to this person.
- If n>1, determine a linear order for the consanguineal family members based on their dates of birth with the senior person having the earliest date of birth.
- Adjust this linear order by incorporating ahead of each corresponding consanguineal family member any affinial spouses:
- If n>1 and n is an even number, compute y=n/2.
- If n>1 and n is an odd number, compute y=(n−1)/2.
- Assign (Y)=(−y) to the senior person or the affinial spouse of the senior person.
- Assign (Y)=(−y+1) to the second person in the linear order, assign (Y)=(−y+2) to the third person in the order, assign (Y)=(−y+3) to the fourth person, and continue such assignments until all individuals assigned to (X)=(−5) have received a Y-Axis assignment.

Count the number of individuals assigned to (X)=(−6); this number is n:
- If n=1, assign (Y)=(0) to this person.
- If n>1, determine a linear order for the consanguineal family members based first on the linear order of their parent or parents in (X)=(−5) and second on their dates of birth, with the senior person having the parent with lowest Y-Value assignment in (X)=(−5).

Adjust this linear order by incorporating ahead of each corresponding consanguineal family member any affinial spouses:

If n>1 and n is an even number, compute y=n/2.
If n>1 and n is an odd number, compute y=(n−1)/2.
Assign (Y)=(−y) to the senior person or the affinial spouse of the senior person.
Assign (Y)=(−y+1) to the second person in the linear order, assign (Y)=(−y+2) to the third person in the order, assign (Y)=(−y+3) to the fourth person, and continue such assignments until all individuals assigned to (X)=(−6) have received a Y-Axis assignment.

Count the number of individuals assigned to (X)=(−7); this number is n:

If n=1, assign (Y)=(0) to this person.
If n>1, determine a linear order for the consanguineal family members based first on the linear order of their parent or parents in (X)=(−6) and second on their dates of birth, with the senior person having the parent with lowest Y-Value assignment in (X)=(−6).

Adjust this linear order by incorporating ahead of each corresponding consanguineal family member any affinial spouses:

If n>1 and n is an even number, compute y=n/2.
If n>1 and n is an odd number, compute y=(n−1)/2.
Assign (Y)=(−y) to the senior person or the affinial spouse of the senior person.
Assign (Y)=(−y+1) to the second person in the linear order, assign (Y)=(−y+2) to the third person in the order, assign (Y)=(−y+3) to the fourth person, and continue such assignments until all individuals assigned to (X)=(−7) have received a Y-Axis assignment.

Count the number of individuals assigned to (X)=(−8); this number is n:

If n=1, assign (Y)=(0) to this person.
If n>1, determine a linear order for the consanguineal family members based first on the linear order of their parent or parents in (X)=(−7) and second on their dates of birth, with the senior person having the parent with lowest Y-Value assignment in (X)=(−7).

Adjust this linear order by incorporating ahead of each corresponding consanguineal family member any affinial spouses:

If n>1 and n is an even number, compute y=n/2.
If n>1 and n is an odd number, compute y=(n−1)/2.
Assign (Y)=(−y) to the senior person or the affinial spouse of the senior person.
Assign (Y)=(−y+1) to the second person in the linear order, assign (Y)=(−y+2) to the third person in the order, assign (Y)=(−y+3) to the fourth person, and continue such assignments until all individuals assigned to (X)=(−8) have received a Y-Axis assignment.

Count the number of individuals assigned to (X)=(−5); this number is n:

If n=1, assign (Y)=(0) to this person.
If n>1, determine a linear order for the consanguineal family members based first on the linear order of their parent or parents in (X)=(−8) and second on their dates of birth, with the senior person having the parent with lowest Y-Value assignment in (X)=(−8).

Adjust this linear order by incorporating ahead of each corresponding consanguineal family member any affinial spouses:

If n>1 and n is an even number, compute y=n/2.
If n>1 and n is an odd number, compute y=(n−1)/2.
Assign (Y)=(−y) to the senior person or the affinial spouse of the senior person.
Assign (Y)=(−y+1) to the second person in the linear order, assign (Y)=(−y+2) to the third person in the order, assign (Y)=(−y+3) to the fourth person, and continue such assignments until all individuals assigned to (X)=(−5) have received a Y-Axis assignment.

Count the number of individuals assigned to (X)=(−6); this number is n:

Continue using this method for (X)=(−6), (X)=(−7), (X)=(−8), (X)=(−5), and so on as needed until all the descendants of the Home Person great-grandparents' siblings have been given Y-Axis assignments.

Sector 6, Home Person's 2-Great-Grandparents' Siblings:

2g. Continue using this method for Sector 6, Sector 7, Sector 8, Sector 9, and so on as needed until all consanguineal relatives of the Home Person have been given Y-Axis assignments.

Step 3: Z-Axis Assignments

Along the Z Axis the icons have both a height and a position. The location of the top of the icon, $(Z_B)$, is the birth date of the person represented by the icon. If the person is deceased as of the date of the display, the location of the bottom of the icon is $(Z_D)$, which is the date of death of that person. If the person is still living as of the date of the display, the location of the bottom of the icon is (Z)=(0). The difference between $(Z_B)$ and either $(Z_D)$ or (0), whichever is appropriate, is the height of the icon in years.

Embodiment II: An Amphitheater Array Displaying Only Ascending Lineal Relatives

In this embodiment of the invention only the direct ancestors of the Home Person are displayed. Because everyone has the same number of direct ancestors, the positions of every ancestor within the amphitheater array can be specified in advance. In the following description, reference is made to FIG. 7 which provides a plan view (i.e., top view) of X and Y offset values for an amphitheater Array Display showing only ascending lineal relatives.

It is likely that not all of the names and other biographical information about, for example, all 128 of the Home Person's 5-great grandparents will be known, however, even though the amphitheater array reserves a specific location for all of them. These unknown ancestors may be dealt with by omitting their icons and moving the icons of the adjacent known ancestors closer to the X Axis or, more preferably, by using placeholder icons for the unknown ancestors.

In a preferred method of using placeholder icons, the unknown ancestors are assigned an arbitrary lifetime length such as sixty years and an arbitrary birth date such as thirty years before the actual or assigned birth date of the immediately following generation (i.e., the generation of that person's child). In cases where there is a known spouse of an unknown ancestor, the known spouse's information may be used to create a matching placeholder icon for the unknown spouse. Other methods of interpolating, extrapolating, or deducing birth and death dates for placeholder icons may also be used. Such methods of assigning missing dates may also be used with ancestors whose names are known but whose birth and/or death dates are not.

The user may elect to display placeholder icons for everyone in nearby generations but not in more distant generations if only a small number of ancestors is known. For example, if 12 of the 16 ancestors four generations back from the Home Person are known then the display would primarily comprise known ancestors. However, if only 6 of the 1,024 ancestors ten generations back from the Home Person were known then a more pleasing display might result if the 1,018 placeholders were not shown. In addition, for clarity the user may elect to show placeholder icons for the spouses of known ancestors in any generation.

Figure 7:
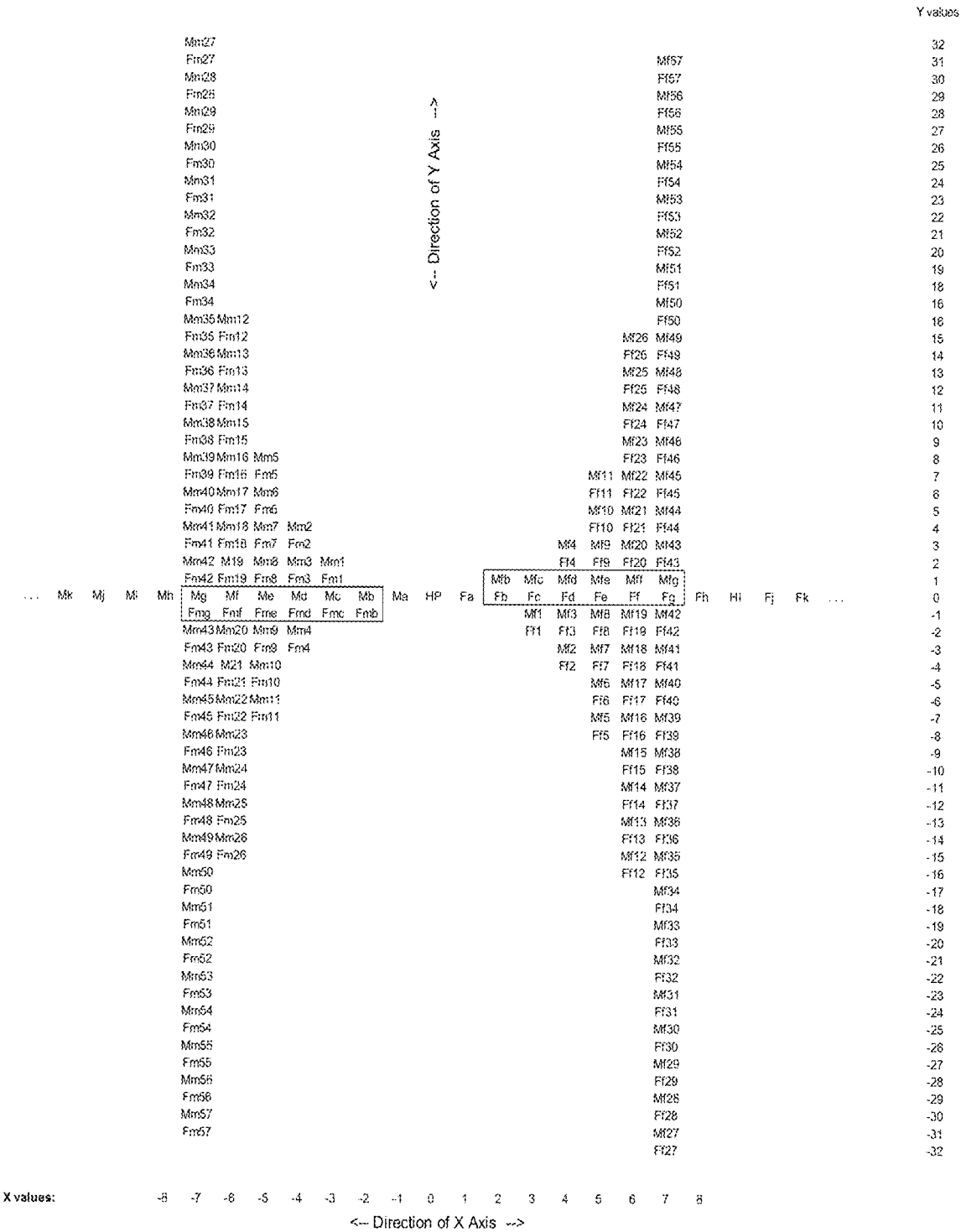
FIG. 7 illustrates a plan view of X and Y value assignments for an amphitheater array displaying only ascending lineal relatives.

In the plan view schematic of the amphitheater array in FIG. 7, the X Axis runs in the left/right direction and the Y Axis runs in the forward/backward direction. The Z Axis, not shown in the schematic, runs in the up/down direction. The X and Y Axes have only numeric values. The X and Y offset coordinates of the icons representing each person are determined using the assignment method in Steps 1 through Step 3 below. The Z coordinates are assigned as described in Step 4.

Step 1: Select a Home Person

Assign (X,Y)=(0,0) to the Home Person (the HP).

Step 2: For ancestors on the father's side of the Home Person:

Assign (X,Y)=(1,0) to the father of the Home Person (this person is Fa for reference).

Assign (X,Y)=(2,0) to the father of the Home Person's father (this person is Fb for reference).

Assign (X,Y)=(3,0) to the father of Fb (this person is Fc for reference).

Assign (X,Y)=(4,0) to the father of Fc (this person is Fd for reference).

Continue assigning (X,Y)=(5,0), (6,0), (7,0), and so on to the fathers of Fd, Fe, Ff, and so on as needed.

Assign (X,Y)=(2,1) to the wife of Fb, (3,1) to the wife of Fc, (4,1) to the wife of Fd, (5,1) to the wife of Fe, and so on as needed.

Assign (X,Y)=(3,−1) and (3,−2), respectively, to the mother and father of the wife of Fb (for reference, this father is Ff1).

Assign (X,Y)=(4,−3) and (4,−4), respectively, to the mother and father of Ff1 (this father is Ff2).

Assign (X,Y)=(4,−1) and (4,−2), respectively, to the mother and father of the wife of Ff1 (this father is Ff3).

Assign (X,Y)=(4,3) and (4,2), respectively to the mother and father of the wife of Fc (this father is Ff4).

Assign (X,Y)=(5,−7) and (5,−8), respectively to the mother and father of Ff2 (this father is Ff5).

Assign (X,Y)=(5,−5) and (5,−6), respectively to the mother and father of the wife of Ff2 (this father is Ff6).

Assign (X,Y)=(5,−3) and (5,−4), respectively to the mother and father of Ff3 (this father is Ff7).

Assign (X,Y)=(5,−1) and (5,−2), respectively to the mother and father of the wife of Ff3 (this father is Ff8).

Assign (X,Y)=(5,2) and (5,3), respectively to the father and mother of the wife of Fd (this father is Ff9).

Assign (X,Y)=(5,4) and (5,5), respectively to the father and mother of Ff4 (this father is Ff10).

Assign (X,Y)=(5,6) and (5,7), respectively to the father and mother of the wife of Ff4 (this father is Ff11).

Assign (X,Y)=(6,−15) and (6,−16), respectively to the mother and father of Ff5 (this father is Ff12).

Assign (X,Y)=(6,−13) and (6,−14), respectively to the mother and father of the wife of Ff5 (this father is Ff13).

Assign (X,Y)=(6,−11) and (6,−12), respectively to the mother and father of Ff6 (this father is Ff14).

Assign (X,Y)=(6,−9) and (6,−10), respectively to the mother and father of the wife of Ff6 (this father is Ff15).

Assign (X,Y)=(6,−7) and (6,−8), respectively to the mother and father of Ff7 (this father is Ff16).

Assign (X,Y)=(6,−5) and (6,−6), respectively to the mother and father of the wife of Ff7 (this father is Ff17).

Assign (X,Y)=(6,−3) and (6,−4), respectively to the mother and father of Ff8 (this father is Ff18).

Assign (X,Y)=(6,−1) and (6,−2), respectively to the mother and father of the wife of Ff8 (this father is Ff19).

Assign (X,Y)=(6,2) and (6,3), respectively to the father and mother of the wife of Fe (this father is Ff20).

Assign (X,Y)=(6,4) and (6,5), respectively to the father and mother of Ff9 (this father is Ff21).

Assign (X,Y)=(6,6) and (6,7), respectively to the father and mother of the wife of Ff9 (this father is Ff22).

Assign (X,Y)=(6,8) and (6,9), respectively to the father and mother of Ff10 (this father is Ff23).

Assign (X,Y)=(6,10) and (6,11), respectively to the father and mother of the wife of Ff10 (this father is Ff24).

Assign (X,Y)=(6,12) and (6,13), respectively to the father and mother of Ff11 (this father is Ff25).

Assign (X,Y)=(6,14) and (6,15), respectively to the father and mother of the wife of Ff11 (this father is Ff26).

Assign (X,Y)=(7,−31) and (7,−32), respectively, to the mother and father and mother of Ff12 (this father is Ff27).

Continue assigning coordinates in this manner to the remaining ancestors on the father's side of the Home Person as needed.

Step 3: For Ancestors on the Mother's Side of the Home Person:

Assign (X,Y)=(−1,0) to the mother of the Home Person (this person is Ma for reference)

Assign (X,Y)=(−2,0) to the mother of the Home Person's mother (this person is Mb for reference).

Assign (X,Y)=(−3,0) to the mother of Mb (this person is Mc for reference).

Assign (X,Y)=(−4,0) to the mother of Mc (this person is Md for reference).

Continue assigning (X,Y)=(−5,0), (−6,0), (−7,0), and so on to the mothers of Md, Me, Mf, and so on as needed.

Assign (X,Y)=(−2,−1) to the husband of Mb, (−3,−1) to the husband of Mc, (−4,−1) to the husband of Md, (−5,−1) to the husband of Me, and so on as needed.

Assign (X,Y)=(−3,1) and (−3,2), respectively, to the father and mother of the husband of Mb (for reference, this mother is Mm1).

Assign (X,Y)=(−4,3) and (−4,4), respectively, to the father and mother of Mm1 (this mother is Mm2).

Assign (X,Y)=(−4,1) and (−4,2), respectively, to the father and mother of the husband of Mm1 (this mother is Mm3).

Assign (X,Y)=(−4,−2) and (−4,−3) respectively to the mother and father of the husband of Mc (this mother is Mm4).

Assign (X,Y)=(−5,7) and (−5,8), respectively, to the father and mother of Mm2 (this mother is Mm5).

Assign (X,Y)=(−5,5) and (−5,6), respectively, to the father and mother of the husband of Mm2 (this mother is Mm6).

Assign (X,Y)=(−5,3) and (−5,4), respectively, to the father and mother of Mm3 (this mother is Mm7).

Assign (X,Y)=(−5,1) and (−5,2), respectively, to the father and mother of the husband of Mm3 (this mother is Mm8).

Assign (X,Y)=(−5,−2) and (−5,−3), respectively, to the mother and father of the husband of Md (this mother is Mm9).

Assign (X,Y)=(−5,−4) and (−5,−5), respectively, to the mother and father of Mm4 (this mother is Mm10).

Assign (X,Y)=(−5,−6) and (−5,−7), respectively, to the mother and father of the husband of Mm4 (this mother is Mm11).

Assign (X,Y)=(−6,15) and (−6,16), respectively, to the father and mother of Mm5 (this mother is Mm12).

Assign (X,Y)=(−6,13) and (−6,14), respectively, to the father and mother of the husband of Mm5 (this mother is Mm13).

Assign (X,Y)=(−6,11) and (−6,12), respectively, to the father and mother of Mm6 (this mother is Mm14).

Assign (X,Y)=(−6,9) and (−6,10), respectively, to the father and mother of the husband of Mm6 (this mother is Mm15).

Assign (X,Y)=(−6,7) and (−6,8), respectively, to the father and mother of Mm7 (this mother is Mm16).

Assign (X,Y)=(−6,5) and (−6,6), respectively, to the father and mother of the husband of Mm7 (this mother is Mm17).

Assign (X,Y)=(−6,3) and (−6,4), respectively, to the father and mother of Mm8 (this mother is Mm18).

Assign (X,Y)=(−6,1) and (−6,2), respectively, to the father and mother of the husband of Mm8 (this mother is Mm19).

Assign (X,Y)=(−6,−2) and (−6,−3), respectively, to the mother and father of the husband of Me (this mother is Mm20).

Assign (X,Y)=(−6,−4) and (−6,−5), respectively, to the mother and father of Mm9 (this mother is Mm21).

Assign (X,Y)=(−6,−6) and (−6,−7), respectively, to the mother and father of the husband of Mm9 (this mother is Mm 22).

Assign (X,Y)=(−6,−8) and (−6,−9), respectively, to the mother and father of Mm10 (this mother is Mm23).

Assign (X,Y)=(−6,−10) and (−6,−11), respectively, to the mother and father of the husband of Mm 10 (this mother is Mm24).

Assign (X,Y)=(−6,−12) and (−6,−13), respectively, to the mother and father of Mm11 (this mother is Mm25).

Assign (X,Y)=(−6,−14) and (−6,−15), respectively, to the mother and father of the husband of Mm11 (this mother is Mm26).

Assign (X,Y)=(7,31) and (7,32), respectively to the father and mother of Mm12 (this mother is Mm27).

Continue assigning coordinates in this manner to the remaining ancestors on the mother's side of the Home Person as needed.

Step 4: Z-Axis Assignments

Along the Z Axis the icons have both a height and a position. The location of the top of the icon, ($Z_B$), is the birth date of the person represented by the icon. If the person is deceased as of the date of the display, the location of the bottom of the icon is ($Z_D$), which is the date of death of that person. If the person is still living as of the date of the display, the location of the bottom of the icon is (Z)=(0). The difference between ($Z_B$) and either ($Z_D$) or (0), whichever is appropriate, is the height of the icon in years.

The so-called amphitheater display (Scene) described for Embodiment II presents generations of individuals is straight rows and columns in the X and Y dimensions. Optionally, the icons can be displayed in uniformly curved rows, variably curved rows, or a combination straight and curved rows by varying the algorithms used to generation the X and Y coordinates. Optionally, the software that encodes the X, Y, and Z coordinates can compute the positions of the icons in the X-Y plane using polar coordinates to facilitate non-linear arrays of the icons.

Web-Based Implementation of an Embodiment of the Methods Described Herein.

FIG. 8 provides a flow chart for a web-based implementation of a computer-assisted method for displaying dynamic three-dimensional chronological biographical information. Initially, a user at a computer interface opens a website that hosts the genealogical software and stored biographical information. User logs into the website and if User does not have an account, User is prompted to sign up to establish and account. If User has an authorized account, User is admitted and selects Source Data. If the Source Data is resident on the host site (Source Data remotely known), an Input File is loaded from a secured dynamic database (DYNAMODB). If the Source Data is not already resident on the host site, Source Data is uploaded by User to the dynamic database (e.g., from a GEDCOM file). The uploaded Source Data is then converted via resident Input Software into an Input File, which is then uploaded to the dynamic database. Once an Input file is uploaded, User selects a Home Person (HP) for generating a Display Array. User also selects a Scene Name, which represents a set of geometric parameters pre-defined as a Scene for the Display Array. The choice of HP and Scene determine which individuals from the Source Data are displayed, and how (e.g., how the icons for the individuals are displayed in the X, Y, and Z dimensions, the appearance of the icons, and the like). If the combination of Input File, Scene Name, and Home Person has already been stored and associated with User's account on the host site, Array Software is populated with a known Display File to generate a Display Array. If the combination of Input File, Scene Name, and Home Person has not been previously stored and associated with User's account on the host site, the host software converts the combination of Input File, Scene Name, and Home Person into a Display file, which is then uploaded to the dynamic database for use by the Array Software to populate the Display Array. Finally, the Display Array is displayed on User's display screen by the Array Software and User can then virtually navigate around and through the icons within the Display Array.

Any and all references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing materials or methods (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the materials or methods described herein and does not pose a limitation on the scope of the claims unless otherwise stated. No language in the specification should be construed as indicating any non-claimed element as essential to the practice of the claims.

Preferred embodiments are described herein, including the best mode known to the inventors for carrying out the claimed invention. Variations of those preferred embodiments may become apparent to those of ordinary skill in the art upon reading the foregoing description. The inventors expect skilled artisans to employ such variations as appropriate, and the inventors intend for the claimed invention to be practiced otherwise than as specifically described herein. Accordingly, the claimed invention includes all modifications and equivalents of the subject matter recited in the claims appended hereto as permitted by applicable law. Moreover, any combination of the above-described elements in all possible variations thereof is encompassed by the claimed invention unless otherwise indicated herein or otherwise clearly contradicted by context.

What is claimed is:

1. A computer implemented method for creating a three-dimensional graphics display from genealogical family tree data, the method comprising the steps of:
   (a) providing a genealogical family tree data set comprising biographical information on multiple individuals to a computer processing and memory device comprising software for input, processing, and display of information; wherein the biographical information concerning each individual comprises chronological information about when the individual lived or is living, and information regarding the genealogical relationship of the individual to at least one other individual in the family tree data set;
   (b) the software associating the biographical information of each individual in the family tree data set with a virtual three-dimensional icon for each individual;
   (c) the software generating a three-dimensional genealogical data set by assigning coordinates for the position of each icon in a coordinate system consisting of orthogonal X, Y and Z dimensions, thereby defining a three-dimensional display array incorporating the X, Y and Z dimensions; wherein:
   (i) the Z dimension is a time dimension covering a range of dates extending backward in time from the present date to a specified date in the past;
   (ii) the X and Y dimensions comprise arbitrary units;
   (iii) the software assigns a first Z coordinate value corresponding to a date of birth of the individual represented by the icon, and a second Z coordinate value corresponding to a date of death of the individual represented by the icon or the current date if the individual represented by the icon is currently living; wherein the first and second Z coordinate values define a position and length for each icon in the Z dimension;
   (iv) the software assigns the X and Y coordinate values for each icon so as to avoid overlap of the icons in the three-dimensional display array; and
   (v) the X and Y coordinates for each icon are assigned relative to X and Y coordinates of a home person designated by a user or by a default setting in the software;
   (d) the software encoding the three-dimensional genealogical data set in a three-dimensional graphics display computer code to form a graphics display data set; and
   (e) the software displaying an image of at least a portion of the icons from the graphics display data set on a graphics display device in communication with the computer processing and memory device; wherein the image reflects the perspective of a viewer that is virtually present within a virtual space encompassing the three-dimensional display array, and the perspective of the image changes in real time in response to navigational inputs of the user.

2. The method of claim 1, wherein the date of birth is an approximate date of birth assigned to the individual represented by a particular icon when the biographical information for that individual does not include an actual date of birth, or when the date of birth included in the biographical information is logically erroneous.

3. The method of claim 1, wherein the date of death is an approximate date of death assigned to the individual represented by a particular icon when the biographical information for that individual does not include an actual date of death and does not indicate that the particular individual is still living, or when the date of death included in the biographical information is logically erroneous.

4. The method of claim 1, wherein the genealogical family tree data is provided by uploading from a genealogical database file, by accessing the data on a computer processing and memory storage device on which the data is native, by manually entering the biographical information, or a combination of two or more of the foregoing.

5. The method of claim 1, wherein the software assigns a variable alternate second Z coordinate value to individuals who were stillborn or who died in infancy or early childhood, wherein the alternate second Z coordinate value varies with the perspective of a displayed image in step (e) in order to give the icon of the individual who was stillborn or died in infancy or early childhood a minimum apparent height in the Z dimension in a given display perspective.

6. The method of claim 1, wherein shape of the icons is irregular or varies in the X and Y dimensions as a function of the Z coordinate values for the icons.

7. The method of claim 1, wherein the X and Y coordinate values are assigned in step (c) by an algorithm that adjusts the X and Y coordinate values based on the number of icons being displayed in step (e) and/or based on one or more viewing options selected by the user.

8. The method of claim 1, wherein the shape and/or appearance of each of the icons displayed in step (e) varies depending on the genealogical relationship of the icons to the home person and/or one or more other type of information present in the biographical information for the individuals represented by the icons.

9. The method of claim 1, wherein one or more lines or other shapes parallel to the Z axis are displayed along with the icons; and the line or other shape comprises Z dimension time markings, thereby acting as a reference for assessing the time period in which the individuals represented by the icons lived and/or the Z coordinate of a virtual viewer within the virtual space.

10. The method of claim 1, wherein the home person is assigned X, Y coordinate values of 0,0; and the X and Y coordinate values for the icons representing all other individuals to be displayed are assigned relative to X and Y coordinates of the home person based on the respective genealogical relationships of the other individuals to the home person.

11. The method of claim 1, further comprising displaying tie-lines between or among icons representing specified degrees of genealogical relatedness between the individuals represented by the icons.

12. The method of claim 1, wherein each of the icons includes one or more display appearance characteristics selected from the group consisting of a particular shape, a color, a fill pattern, text, an image, shading, a variation in brightness, a variation in color, bands of different colors, a variation in a fill pattern, bands of different fill patterns, a variation in shape, multiple shapes connected together, rotation along one or more axis within the virtual space, and vibration along one or more axis within the virtual space.

13. The method of claim 12, wherein the display characteristics are selected based on one or more characteristics present in the biographical information of the individual represented by the icon, familial genealogical relationships between the individuals represented by the icons, or both.

14. The method of claim 1, wherein information from the genealogical family tree data set relating to an individual is displayable on any surface of the icon representing the individual, or is displayable in one or more popup display boxes or cut-scene windows, when an icon is selected by user input.

15. The method of claim 1, wherein the icons are displayable from any virtual perspective and point of view outside or inside the region of the three-dimensional display array in which the icons are located.

16. The method of claim 15, wherein the perspective and point of view are dynamically alterable to show a view that is upward, downward, leftward, and/or rightward in the virtual space relative to an initial perspective and point of view.

17. The method of claim 1, wherein user selectable information is displayable on the display device via interactive popup windows, dropdown menus, rollovers, labels, icon badges, other badges, borders, banners, split screens, cut screens, or a combination of two or more of the foregoing.

18. The method of claim 1, wherein the user is represented by a dynamically movable, navigable avatar icon in the virtual space, and the icons are dynamically displayed from the perspective of the moving avatar icon.

19. The method of claim 1, wherein the virtual space includes one or more position indicating and reference aids selected from the group consisting of maps, mini maps, altitude indicators, reference planes, reference volumes or ranges, navigation bars, and compass icons, to assist the user in navigating through the virtual space.

20. The method of claim 1, wherein placeholder icons are created in the virtual space for individuals of interest not specifically included in the genealogical family tree data set.

21. The method of claim 1, wherein the graphic display device is one or more devices such as a computer display, an electronic tablet, a cellphone, a television, video game display, electronic eyeglasses, an ocular headset, a three-dimensional virtual reality display device, a spatial computing device, a wristwatch display, a wristband display, or other wearable display.

22. The method of claim 1, wherein the virtual space comprises one or more representations selected from the group consisting of objects, vistas, geographic effects, background effects, aerial effects, airborne effects, atmospheric effects, and sound effects, so as to appear as a virtual world or worlds, and wherein the representations are variable based on user input, user selection, programmed defaults, and responses to navigation through the virtual space by the user, based on any characteristic or parameter in the three-dimensional graphic display data set.

23. The method of claim 1, wherein the software further encodes a search function to facilitate locating a particular icon within the virtual space.

24. A computer implemented method for creating a three-dimensional graphics display from genealogical family tree data, the method comprising the steps of:
(a) selecting a genealogical family tree data set comprising discrete individuals of interest from a computer processing and memory device, wherein the discrete individuals of interest are associated with genealogical interconnecting characteristics and with elements of defining characteristics including at least (i) a date of birth, and (ii) either a date of death or an indication that the individual of interest is currently living;
(b) assigning coordinates in a three-dimensional coordinate system consisting of orthogonal x, y and z dimensions to each of the discrete individuals of interest to define for each individual of interest an icon that is displayable in a three-dimensional virtual space incorporating the x, y and z dimensions; wherein:
  (i) the z dimension is a time dimension covering a range of dates extending backward in time from the present date, or a date in the future, to a specified date in the past;
  (ii) each icon is assigned a first z icon-shape coordinate value corresponding to the date of birth of the individual represented by the icon, and a second z icon-shape coordinate value corresponding to the date of death of the individual represented by the icon or the current date if the individual represented by the icon is currently living, and the first and second z icon-shape coordinate values define a position and length for each icon in the z dimension;
  (iii) each icon is assigned a set of x and y offset-coordinate values and a set of x and y icon-shape coordinate values; and
  (iv) the first and second z icon-shape coordinate values together with the set of x and y icon-shape coordinate values define a shape for each respective icon; and the set of x and y offset-coordinate values are selected to avoid overlap of the icons in the x and y dimensions when displayed in the virtual space;
(c) encoding the elements of defining characteristics and the elements of genealogical interconnecting characteristics for each individual of interest, in combination with the respective x, y and z coordinates for each icon into a three-dimensional genealogical data set in which the elements of defining characteristics and the elements of genealogical interconnecting characteristics of each individual of interest are associated with the icon representing that individual of interest;
(d) encoding the three-dimensional genealogical data set in a three-dimensional graphics display computer code to form a display data set; and
(e) displaying at least a portion of the icons from the graphics display data set in the virtual space on a graphics display device in communication with the computer processing and memory device.

* * * * *